US008408018B2

(12) United States Patent
Takegami et al.

(10) Patent No.: US 8,408,018 B2
(45) Date of Patent: Apr. 2, 2013

(54) REFRIGERATION APPARATUS

(75) Inventors: Masaaki Takegami, Osaka (JP); Satoru Sakae, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 653 days.

(21) Appl. No.: 12/675,624

(22) PCT Filed: Aug. 28, 2008

(86) PCT No.: PCT/JP2008/002343
§ 371 (c)(1),
(2), (4) Date: Feb. 26, 2010

(87) PCT Pub. No.: WO2009/028193
PCT Pub. Date: Mar. 5, 2009

(65) Prior Publication Data

US 2010/0251738 A1 Oct. 7, 2010

(30) Foreign Application Priority Data

Aug. 28, 2007 (JP) ................................ 2007-221551

(51) Int. Cl.
*F25B 1/00* (2006.01)
*F25B 49/00* (2006.01)
*F25B 43/02* (2006.01)

(52) U.S. Cl. ......................... 62/228.5; 62/228.3; 62/468

(58) Field of Classification Search ................. 62/228.5, 62/228.3, 468, 510, 175; 200/81 R
See application file for complete search history.

(56) References Cited

U.S. PATENT DOCUMENTS

2007/0245768 A1 10/2007 Sakae et al.

FOREIGN PATENT DOCUMENTS

| | | | |
|---|---|---|---|
| JP | 3-172587 | A | 7/1991 |
| JP | 6-11207 | A | 1/1994 |
| JP | 8-49928 | A | 2/1996 |
| JP | 2007-93017 | A | 4/2007 |

*Primary Examiner* — Chen Wen Jiang
(74) *Attorney, Agent, or Firm* — Birch, Stewart, Kolasch & Birch, LLP

(57) ABSTRACT

A refrigeration device includes a switching valve control section for outputting a switching signal for controlling a four-way switching valve to a predetermined switching state when starting a compression mechanism; and a switching determination section which, when starting only a first compressor as a start-up of the compression mechanism, outputs a low differential pressure signal if a differential pressure between a high-pressure port and a low-pressure port in the four-way switching valve falls below a determination value in a determination operation after the switching signal being outputted by the switching valve control section. After the switching determination section outputs the low differential pressure signal, a capacity control section starts a second compressor.

6 Claims, 11 Drawing Sheets

REFRIGERATION APPARATUS

TECHNICAL FIELD

The present invention relates to a refrigeration apparatus in which a four-way switching valve is connected to a compression mechanism including a plurality of compressors.

BACKGROUND ART

Conventionally, refrigeration apparatuses have been known, in which a four-way switching valve is connected to a compression mechanism including a plurality of compressors. For example, Patent Document 1 discloses the refrigeration apparatus of this type. In such a refrigeration apparatus, the compression mechanism is constituted by a compressor with variable operating capacity; and a compressor with fixed operating capacity. In each compressor of the compression mechanism, oil is supplied to a sliding portion based on a pressure difference between discharge and suction refrigerant in the compression mechanism. In addition, the four-way switching valve is switched based on a differential pressure between a high-pressure port communicating with a discharge side of the compression mechanism and a low-pressure port communicating with a suction side of the compression mechanism.

CITATION LIST

Patent Document

Patent Document 1: Japanese Patent Publication No. 2007-93017

SUMMARY OF THE INVENTION

Technical Problem

The more operating capacity the compression mechanism has, the quicker a valving element in the four-way switching valve moves. Thus, the four-way switching valve is switched for a short period of time. On the other hand, the compressor with variable operating capacity cannot increase the operating capacity immediately after starting thereof, resulting in gradually increasing the operating capacity. Thus, in a conventional refrigeration apparatus, if only the compressor with variable operating capacity is started in the compression mechanism, it requires more time to switch the four-way switching valve when starting the compression mechanism.

The present invention has been made in view of the foregoing, and it is an object of the present invention to shorten the time period required for switching the four-way switching valve when starting the compression mechanism in the refrigeration apparatus in which the four-way switching valve is connected to the compression mechanism including the plurality of compressors.

Solution to the Problem

A first aspect of the invention is intended for a refrigeration apparatus including a refrigerant circuit (4) provided with a compression mechanism (40) in which a first compressor (14*a*) with variable operating capacity and a second compressor (14*b*) with fixed operating capacity are connected to each other on a discharge side; and with a pilot-type four-way switching valve (20) which is able to switch depending on a differential pressure between a high-pressure port (P1) which is connected to the compression mechanism (40), and which communicates with the discharge side of the compression mechanism (40), and a low-pressure port (P3) communicating with a suction side of the compression mechanism (40).

The refrigeration apparatus (1) includes a capacity control section (51) for starting the first compressor (14*a*) at a lower operating capacity level when starting thereof; a switching valve control section (58) for outputting a switching signal for controlling the four-way switching valve (20) to a predetermined switching state when starting the compression mechanism (40); and a switching determination section (59) which, when starting only the first compressor (14*a*) as a start-up of the compression mechanism (40), performs a determination operation for comparing the differential pressure with a predetermined determination value after the switching signal being outputted by the switching valve control section (58), and which outputs a low differential pressure signal if the differential pressure falls below the determination value in the determination operation. After the switching determination section (59) outputs the low differential pressure signal, the capacity control section (51) starts the second compressor (14*b*).

A second aspect of the invention is intended for the refrigeration apparatus of the first aspect of the invention, in which the capacity control section (51) maintains the operating capacity of the first compressor (14*a*) constant after the first compressor (14*a*) is started and before the determination operation is completed.

A third aspect of the invention is intended for the refrigeration apparatus of the first or second aspect of the invention, in which, after the low differential pressure signal is outputted, the switching determination section (59) outputs a switching completion signal if a completion condition for determining whether or not the switching of the four-way switching valve (20) is completed is satisfied; and the capacity control section (51) stops the second compressor (14*b*) when the switching determination section (59) outputs the switching completion signal.

A fourth aspect of the invention is intended for the refrigeration apparatus of the third aspect of the invention, in which the capacity control section (51) maintains the operating capacity of the first compressor (14*a*) constant after the first compressor (14*a*) is started and before the second compressor (14*b*) is stopped.

A fifth aspect of the invention is intended for the refrigeration apparatus of any one of the first to fourth aspects of the invention, in which the compression mechanism (40) includes a third compressor (14*c*) with fixed operating capacity, and the first compressor (14*a*), the second compressor (14*b*), and the third compressor (14*c*) are connected to each other in parallel; the refrigeration apparatus further includes an abnormality determination section (52) for determining whether or not there is an abnormality in the second compressor (14*b*); and the capacity control section (51) starts the third compressor (14*c*) instead of starting the second compressor (14*b*) if the abnormality determination section (52) determines that there is the abnormality in the second compressor (14*b*), and if the differential pressure falls below the determination value in the determination operation.

A sixth aspect of the invention is intended for the refrigeration apparatus of any one of the first to fifth aspects of the invention, in which oil is supplied to a sliding portion of the first compressor (14*a*) based on the differential pressure.

Features

In the first aspect of the invention, the switching valve control section (58) outputs the switching signal for controlling the four-way switching valve (20) to the predetermined switching state when starting the compression mechanism (40). Since the switching valve control section (58) does not confirm the switching state of the four-way switching valve (20), the switching signal is outputted even when the four-way switching valve (20) is already in the predetermined switching state. If the four-way switching valve (20) is not in the predetermined switching state, and the four-way switching valve (20) is switched by the switching signal, the high-pressure port (P1) communicates with the low-pressure port (P3) during the switching of the four-way switching valve (20). When the four-way switching valve (20) is being switched, the differential pressure is decreased as compared with that when not switching the four-way switching valve (20). In the first aspect of the invention, when starting only the first compressor (14*a*) as the start-up of the compression mechanism (40), the switching determination section (59) performs the determination operation for determining whether or not the four-way switching valve (20) is being switched by utilizing the decrease in the differential pressure during the switching of the four-way switching valve (20). The switching determination section (59) outputs the low differential pressure signal if the differential pressure falls below the predetermined determination value in the determination operation. The low differential pressure signal is outputted when the high-pressure port (P1) communicates with the low-pressure port (P3), i.e., when the four-way switching valve (20) is being switched. After the low pressure differential signal is outputted, the capacity control section (51) starts the second compressor (14*b*).

In the second aspect of the invention, the operating capacity of the first compressor (14*a*) is maintained constant until the determination operation is completed. Thus, the differential pressure is unsusceptible to the change in the operating capacity of the first compressor (14*a*).

In the third aspect of the invention, the switching completion signal is outputted when the completion condition is satisfied after the low differential pressure signal being outputted. After the switching completion signal is outputted, the second compressor (14*b*) is stopped. In the third aspect of the invention, the switching of the four-way switching valve (20) is completed after the second compressor (14*b*) being started, followed by stopping the second compressor (14*b*).

In the fourth aspect of the invention, the operating capacity of the first compressor (14*a*) is maintained constant until the second compressor (14*b*) is stopped. After the second compressor (14*b*) is stopped, the operating capacity of the first compressor (14*a*) is adjusted from the operating capacity when starting thereof as necessary.

In the fifth aspect of the invention, the abnormality determination section (52) determines whether or not there is the abnormality in the second compressor (14*b*). If the abnormality determination section (52) determines that there is the abnormality in the second compressor (14*b*), and the differential pressure falls below the determination value in the determination operation, the capacity control section (51) starts the third compressor (14*c*) without starting the second compressor (14*b*).

In the sixth aspect of the invention, oil is supplied to the sliding portion of the first compressor (14*a*) based on the differential pressure. In the first compressor (14*a*), an amount of the oil supplied to the sliding portion is dependent upon the magnitude of the differential pressure.

Advantages of the Invention

In the present invention, when starting only the first compressor (14*a*) as the start-up of the compression mechanism (40), the second compressor (14*b*) is started if the differential pressure falls below the determination value in the determination operation. The second compressor (14*b*) is started when the four-way switching valve (20) is being switched. After the second compressor (14*b*) is started, an entire operating capacity of the compression mechanism (40) increases by the operating capacity of the second compressor (14*b*). Since the second compressor (14*b*) has the fixed operating capacity, the maximum operating capacity of the second compressor (14*b*) is added to the operating capacity of the compression mechanism (40), thereby significantly increasing the operating capacity of the compression mechanism (40). Thus, a valving element of the four-way switching valve (20) quickly moves after the second compressor (14*b*) being started, thereby shortening a time period required for switching the four-way switching valve (20) when starting the compression mechanism (40).

In the second aspect of the invention, the operating capacity of the first compressor (14*a*) is maintained constant until the determination operation is completed, thereby making the differential pressure unsusceptible to the change in the operating capacity of the first compressor (14*a*) in the determination operation. Thus, in the determination operation, it can be precisely determined whether or not the four-way switching valve (20) is being switched.

In the fifth aspect of the invention, if the abnormality determination section (52) determines that the second compressor (14*b*) is in the abnormal state, and the differential pressure falls below the determination value in the determination operation, the third compressor (14*c*) is started instead of starting the second compressor (14*b*). Thus, even if there is the abnormality in the second compressor (14*b*), the operating capacity of the compression mechanism (40) is significantly increased, thereby shortening the time period required for switching the four-way switching valve (20) when starting the compression mechanism (40).

In the sixth aspect of the invention, the first compressor (14*a*) is a compressor in which the amount of the oil supplied to the sliding portion is dependent upon the magnitude of the differential pressure. As described above, the differential pressure is decreased during the switching of the four-way switching valve (20). Thus, in the conventional refrigeration apparatus, when starting only the first compressor (14*a*) as the start-up of the compression mechanism (40) to switch the four-way switching valve (20), it takes more time to switch the four-way switching valve (20), and the differential pressure is decreased during such time period. In addition, a time period is extended, for which the amount of the oil supplied to the sliding portion is reduced in the first compressor (14*a*). This causes a damage of the first compressor (14*a*) due to inadequate lubrication. On the other hand, in the sixth aspect of the invention, the time period required for switching the four-way switching valve (20) when starting the compression mechanism (40) is shortened as described above. Thus, the time period for which the amount of the oil supplied to the sliding portion is reduced in the first compressor (14*a*) is shortened, thereby improving a state of the oil supply to the first compressor (14*a*) when starting the compression mechanism (40).

DESCRIPTION OF REFERENCE CHARACTERS

Figure 1:
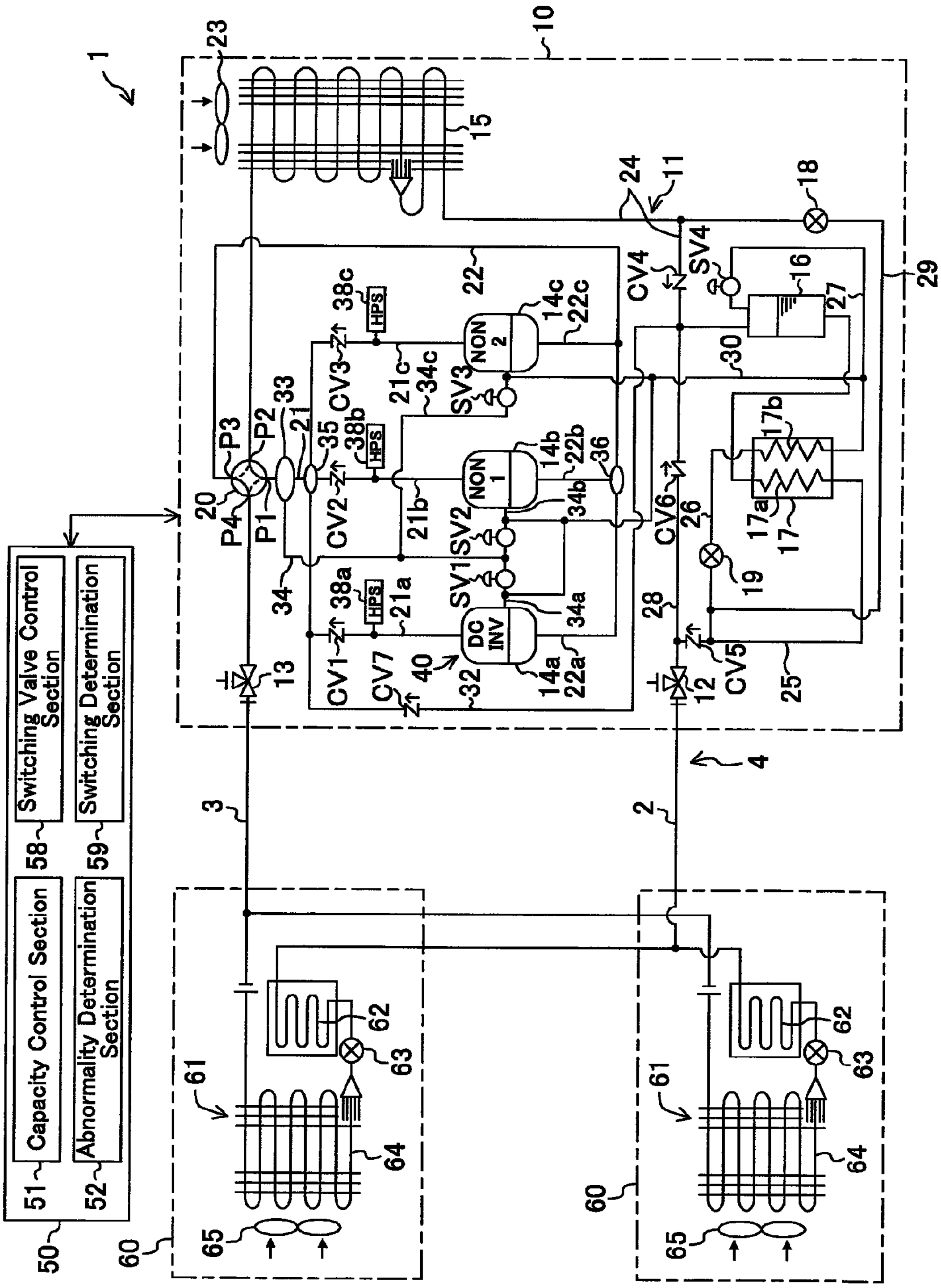
FIG. 1 is a refrigerant circuit diagram of a refrigeration apparatus of Embodiment 1 of the present invention.

| | |
|---|---|
| 1 | Refrigeration Apparatus |
| 4 | Refrigerant Circuit |
| 14a | First Compressor |
| 14b | Second Compressor |
| 14c | Third Compressor |
| 20 | Four-Way Switching Valve |
| 40 | Compression Mechanism |
| 50 | Controller |
| 51 | Capacity Control Section (Capacity Control Means) |
| 52 | Abnormality Determination Section (Abnormality Determination Means) |
| 58 | Switching Valve Control Section (Switching Valve Control Means) |
| 59 | Switching Determination Section (Switching Determination Means) |

DESCRIPTION OF EMBODIMENTS

Embodiments of the present invention will be described in detail hereinafter with reference to the drawings.

Embodiment 1

Embodiment 1 of the present invention will be described.

<Entire Structure of Refrigeration Apparatus>

Embodiment 1 relates to a refrigeration apparatus (1) of the present invention. The refrigeration apparatus (1) is for cooling inside a refrigerator. The refrigeration apparatus (1) includes two internal units (60) for a single external unit (10). The number of the internal units (60) is merely provided as an example.

An external circuit (11) is accommodated in the external unit (10), and an internal circuit (61) is accommodated in each of the internal units (60). In the refrigeration apparatus (1), the internal circuits (61) are connected to the external circuit (11) in parallel through a liquid-side connecting pipe (2) and a gas-side connecting pipe (3), thereby forming a refrigerant circuit (4) in which a vapor compression refrigeration cycle is performed.

A first stop valve (12) and a second stop valve (13) are provided in end portions of the external circuit (11). One end of the liquid-side connecting pipe (2) is connected to the first stop valve (12). The other end of the liquid-side connecting pipe (2) branches into two paths, and such paths are connected to liquid-side ends of the internal circuits (61). One end of the gas-side connecting pipe (3) is connected to the second stop valve (13). The other end of the gas-side connecting pipe (3) branches into two paths, and such paths are connected to gas-side ends of the internal circuits (61).

<<External Unit>>

The external circuit (11) of the external unit (10) includes a compression mechanism (40); an external heat exchanger (15); a receiver (16); a super-cooling heat exchanger (17); a first external expansion valve (18); a second external expansion valve (19); a four-way switching valve (20); and an oil separator (33).

The compression mechanism (40) is constituted by a first compressor (14_a_) with operating capacity which changes in multi-levels; a second compressor (14_b_) with fixed operating capacity; and a third compressor (14_c_) with fixed operating capacity. These compressors (14_a_, 14_b_, 14_c_) are connected to each other in parallel.

The first compressor (14_a_), the second compressor (14_b_), and the third compressor (14_c_) are hermetic, high-pressure dome-type scroll compressors. Electrical power is supplied to the first compressor (14_a_) through an inverter. The first compressor (14_a_) gradually adjusts the operating capacity thereof by changing output frequency of the inverter. The operating capacity of the first compressor (14_a_) is adjustable to a plurality of levels (e.g., 8 levels). On the other hand, in the second compressor (14_b_) and the third compressor (14_c_), electric motors are constantly operated at a fixed rotational speed, and the operating capacities thereof are not changeable.

As a method for supplying oil, a differential-pressure-type oil supply method using a differential pressure between high-level and low-level pressure is employed to these compressors (14_a_, 14_b_, 14_c_). Specifically, in each of the compressors (14_a_, 14_b_, 14_c_), an oil sump for accumulating refrigerating machine oil is formed in a bottom portion of a casing of a high-pressure space. A lower end of a rotating shaft connected to a rotor of the electric motor and to a scroll-type fluid machine is immersed in the accumulated oil. A centrifugal pump is provided at the lower end of the rotating shaft. An oil passage is formed along a center axis of the rotating shaft. In each of the compressors (14_a_, 14_b_, 14_c_), the refrigerating machine oil drawn from the oil sump flows into a low-pressure portion of the fluid machine through the oil passage, thereby lubricating the sliding portion. The refrigerating machine oil is drawn by using a pressure difference between high-pressure and low-pressure refrigerant, and by using the centrifugal pump.

Ends of a first discharge pipe (21_a_), of a second discharge pipe (21_b_), and of a third discharge pipe (21_c_) are connected to discharge sides of the first compressor (14_a_), of the second compressor (14_b_), and of the third compressor (14_c_), respectively. A check valve (CV1), a check valve (CV2), and a check valve (CV3) are provided in the first discharge pipe (21_a_), the second discharge pipe (21_b_), and the third discharge pipe (21_c_), respectively. These check valves (CV1, CV2, CV3) are for allowing refrigerant to flow only in a direction toward a discharge junction pipe (21). The other ends of the discharge pipes (21_a_, 21_b_, 21_c_) are connected to a first port (P1) of the four-way switching valve (20) through the discharge junction pipe (21). The first port (P1) functions as a high-pressure port (P1) communicating with a discharge side of the compression mechanism (40).

Ends of a first suction pipe (22*a*), of a second suction pipe (22*b*), and of a third suction pipe (22*c*) are connected to suction sides of the first compressor (14*a*), of the second compressor (14*b*), and of the third compressor (14*c*), respectively. The other ends of these suction pipes (22*a*, 22*b*, 22*c*) are connected to a third port (P3) of the four-way switching valve (20) through a suction junction pipe (22). The third port (P3) functions as a low-pressure port (P3) communicating with a suction side of the compression mechanism (40).

The oil separator (33) is provided in the discharge junction pipe (21). The oil separator (33) is for separating the refrigerating machine oil from refrigerant discharged from the compression mechanism (40). One end of an oil return pipe (34) is connected to the oil separator (33). The other end of the oil return pipe (34) branches into a first oil return pipe (34*a*), a second oil return pipe (34*b*), and a third oil return pipe (34*c*). The oil return pipes (34*a*, 34*b*, 34*c*) are connected to intermediate-pressure compression chambers of the compressors (14*a*, 14*b*, 14*c*). Solenoid valves (SV1, SV2, SV3) are provided in the oil return pipes (34*a*, 34*b*, 34*c*).

The external heat exchanger (15) is a cross-fin-type fin-and-tube heat exchanger. The external heat exchanger (15) functions as a heat-source-side heat exchanger. An external fan (23) for sending external air to the external heat exchanger (15) is provided near the external heat exchanger (15). In the external heat exchanger (15), heat is exchanged between refrigerant and external air. One end of the external heat exchanger (15) is connected to a second port (P2) of the four-way switching valve (20). The other end of the external heat exchanger (15) is connected to a top portion of the receiver (16) through a first liquid pipe (24). A check valve (CV4) for allowing refrigerant to flow only in a direction toward the receiver (16) is provided in the first liquid pipe (24). A fourth port (P4) of the four-way switching valve (20) is connected to the second stop valve (13).

The super-cooling heat exchanger (17) includes a high-pressure flow path (17*a*) and a low-pressure flow path (17*b*), and is designed to perform heat exchange between refrigerant flowing in the high-pressure flow path (17*a*) and in the low-pressure flow path (17*b*). The super-cooling heat exchanger (17) is, e.g., a plate heat exchanger.

An inflow end of the high-pressure flow path (17*a*) is connected to a bottom portion of the receiver (16). An outflow end of the high-pressure flow path (17*a*) is connected to the first stop valve (12) through a second liquid pipe (25). A check valve (CV5) for allowing refrigerant to flow only in a direction toward the first stop valve (12) side is provided in the second liquid pipe (25).

On the other hand, an inflow end of the low-pressure flow path (17*b*) is connected to a first branched pipe (26) branched from the second liquid pipe (25) on an upstream side of the check valve (CV5). The second external expansion valve (19) is provided in the first branched pipe (26). The second external expansion valve (19) is an electronic expansion valve with adjustable opening. An outflow end of the low-pressure flow path (17*b*) is connected to one end of a gas injection pipe (30) for injecting gas refrigerant into the compressors (14*a*, 14*b*, 14*c*). The other end of the gas injection pipe (30) branches into three paths, and such paths are connected to the oil return pipes (34*a*, 34*b*, 34*c*).

The receiver (16) is arranged between the external heat exchanger (15) and the super-cooling heat exchanger (17), and temporarily stores refrigerant. One end of a degassing pipe (27) is connected to the top portion of the receiver (16). The other end of the degassing pipe (27) is connected to the gas injection pipe (30). A solenoid valve (SV4) is provided in the degassing pipe (27).

One end of a second branched pipe (28) is connected to the second liquid pipe (25) between the check valve (CV5) and the first stop valve (12). The other end of the second branched pipe (28) is connected to the first liquid pipe (24) between the check valve (CV4) and the receiver (16). A check valve (CV6) for allowing refrigerant to flow only in the direction toward the receiver (16) is provided in the second branched pipe (28). A gas supply pipe (32), one end of which is connected to the first discharge pipe (21*a*), is connected to a portion where the second branched pipe (28) and the first liquid pipe (24) are connected to each other. A check valve (CV7) for allowing refrigerant to flow only in a direction toward the first discharge pipe (21*a*) is provided in the gas supply pipe (32).

A third branched pipe (29) is connected between the first liquid pipe (24) and the first branched pipe (26). One end of the third branched pipe (29) is connected to the first liquid pipe (24) between the external heat exchanger (15) and the check valve (CV4). The other end of the third branched pipe (29) is connected to the first branched pipe (26) on the second liquid pipe (25) side with respect to the second external expansion valve (19). The first external expansion valve (18) is provided in the third branched pipe (29). The first external expansion valve (18) is an electronic expansion valve with adjustable opening.

The four-way switching valve (20) is a pilot-type four-way switching valve, and is switchable between a first state (indicated by a solid line in FIG. 1) in which the first port (P1) communicates with the second port (P2) with the third port (P3) communicating with the fourth port (P4), and a second state (indicated by a dashed line in FIG. 1) in which the first port (P1) communicates with the fourth port (P4) with the second port (P2) communicating with the third port (P3).

Figure 2:
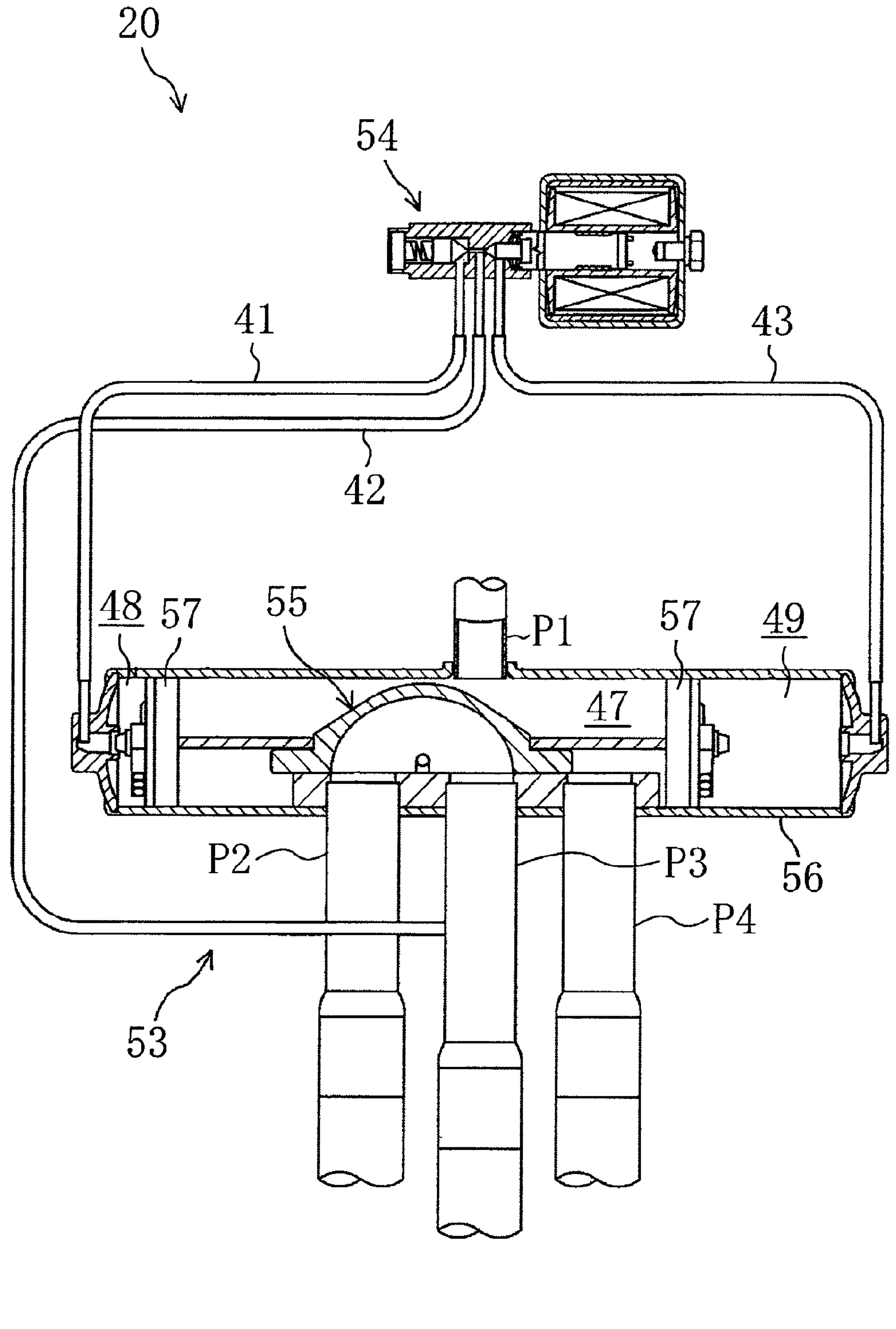
FIG. 2 is a cross-sectional view of a four-way switching valve in Embodiment 1.

Specifically, as illustrated in FIG. 2, the four-way switching valve (20) includes a valve body (53) and a pilot valve (54). The valve body (53) includes a hermetic cylindrical casing (56); a valving element (55) slidably accommodated in the casing (56); and pistons (57) connected to the valving element (55). Cylinder chambers (48, 49) are defined by the pistons (57) at both ends of the casing (56). The first port (P1) is provided in an upper portion of the casing (56). Three ports are provided in a lower portion of the casing (56). As viewed in FIG. 2, a port on the left side is the second port (P2); a port in the middle is the third port (P3); and a port on the right side is the fourth port (P4).

The pilot valve (54) includes an electromagnetic coil; and a plunger inserted into a hollow portion of the electromagnetic coil. The pilot valve (54) switches communication states of three gas pipes (41, 42, 43) by applying or not applying power to the electromagnetic coil. As viewed in FIG. 2, among the three gas pipes (41, 42, 43), the first gas pipe (41) on the left side is connected to the cylinder chamber (48) on the left side in the casing (56); the second gas pipe (42) in the middle is connected to the third port (P3); and the third gas pipe (43) on the right side is connected to the cylinder chamber (49) on the right side in the casing (56).

In the four-way switching valve (20), the communication states of the three gas pipes (41, 42, 43) are switched by the pilot valve (54), thereby making one of the cylinder chambers (48, 49) on the both sides in the casing (56) communicate with the third port (P3). When the cylinder chamber (48) on the left side communicates with the third port (P3), the cylinder chamber (48) on the left side communicates with the suction side of the compression mechanism (40) through the first gas pipe (41) and the second gas pipe (42). The cylinder chamber (48) on the left side becomes a low-pressure space. Meanwhile, high-pressure refrigerant flows into the cylinder chamber (49) on the right side from a high-pressure chamber (47)

between the pistons (57), into which the refrigerant discharged from the compression mechanism (40) flows, through bleed holes, etc. formed in the pistons (57). The cylinder chamber (49) on the right side becomes a high-pressure space. The valving element (55) moves to the left side together with the pistons (57). Conversely, when the cylinder chamber (49) on the right side communicates with the third port (P3), the cylinder chamber (49) on the right side becomes the low-pressure space, and the cylinder chamber (48) on the left side becomes the high-pressure space. The valving element (55) moves to the right side together with the pistons (57). In this manner, the four-way switching valve (20) drives the valving element (55) by using a pressure difference between the first port (P1) to be the high-pressure port (P1) and the third port (P3) to be the low-pressure port (P3) (hereinafter referred to as a "differential pressure"). The four-way switching valve (20) switches between the first and second states by moving the valving element (55).

The external circuit (11) is provided with a high-pressure sensor (35) and a low-pressure sensor (36). The high-pressure sensor (35) is provided at an upstream end of the discharge junction pipe (21). The low-pressure sensor (36) is provided at a downstream end of the suction junction pipe (22). Detected values of the high-pressure sensor (35) and of low-pressure sensor (36) are inputted to a controller (50) which is described later.

In the external circuit (11), high-pressure switches (38a, 38b, 38c) are provided in the discharge pipes (21a, 21b, 21c), respectively. The high-pressure switches (38a, 38b, 38c) are for detecting a discharge pressure, and immediately stopping the compression mechanism (40) under abnormally-high pressure as a protective device.

<<Internal Unit>>

The two internal units (60) have the same structure. In the internal circuit (61) of each of the internal units (60), a drain pan heating pipe (62), an internal expansion valve (63), and an internal heat exchanger (64) are arranged in sequence from a liquid-side end toward a gas-side end.

The internal expansion valve (63) is an electronic expansion valve with adjustable opening. The internal heat exchanger (64) is a cross-fin-type fin-and-tube heat exchanger. The internal heat exchanger (64) functions as an application-side heat exchanger. An internal fan (65) for sending internal air to the internal heat exchanger (64) is provided near the internal heat exchanger (64). In the internal heat exchanger (64), heat is exchanged between refrigerant and internal air. The drain pan heating pipe (62) is arranged in a drain pan provided below the internal heat exchanger (64).

<Structure of Controller>

The controller (50) is for controlling an operation of the refrigeration apparatus (1). The controller (50) controls the compression mechanism (40), the four-way switching valve (20), the electronic expansion valves (18, 19), the solenoid valves (SV1-SV7), etc. In Embodiment 1, the controller (50) includes a capacity control section (51) which is a capacity control means (51); a switching valve control section (58) which is a switching valve control means (58); a switching determination section (59) which is a switching determination means (59); and an abnormality determination section (52) which is an abnormality determination means (52).

The capacity control section (51) controls an operating capacity of the compression mechanism (40) depending on an operating capacity to be required. First, when starting the compression mechanism (40), the capacity control section (51) starts only the first compressor (14a). When starting the first compressor (14a), the capacity control section (51) sets the operating capacity of the first compressor (14a) to the lowest of the plurality of operating capacity levels. The first compressor (14a) is initially started at the lowest operating capacity level.

The capacity control section (51) may start the first compressor (14a) from the lower operating capacity level which is less than or equal to half of the maximum operating capacity. Alternatively, the capacity control section (51) may start the first compressor (14a) from another operating capacity level falling within a range of the lower operating capacity level. The same holds true for Embodiment 2 which is described later. The first compressor (14a) is started at the lower operating capacity level in order to prevent the first compressor (14a) from being damaged due to liquid compression.

In addition, the capacity control section (51) starts the second compressor (14b) as an auxiliary compressor when a low differential pressure signal which is described later, is inputted. If the abnormality determination section (52) which is described later, determines that there is an abnormality in the second compressor (14b), the capacity control section (51) starts the third compressor (14c) as an auxiliary compressor instead of starting the second compressor (14b).

The switching valve control section (58) outputs a switching signal for controlling the four-way switching valve (20) to a predetermined switching state when starting the compression mechanism (40), to the four-way switching valve (20). The switching valve control section (58) does not confirm the switching state of the four-way switching valve (20). Thus, in order to set the four-way switching valve (20) to the first state, the switching valve control section (58) outputs a switching signal for setting the four-way switching valve (20) to the first state even if the four-way switching valve (20) is in the first state. In addition, in order to set the four-way switching valve (20) to the second state, the switching valve control section (58) outputs a switching signal for setting the four-way switching valve (20) to the second state even if the four-way switching valve (20) is in the second state.

The switching determination section (59) performs a determination operation in which the differential pressure is compared with a predetermined determination value (e.g., 0.3 MPa) after the switching signal is outputted by the switching valve control section (58). The determination value is set in the switching determination section (59) in advance. The switching determination section (59) detects a difference between the detected values of the high-pressure sensor (35) and of the low-pressure sensor (36) as the differential pressure.

According to the determination operation, a position of the valving element (55) of the four-way switching valve (20) can be determined. Specifically, in the determination operation, if the differential pressure is greater than or equal to the determination value, it can be determined that the valving element (55) is in a position corresponding to either first or second state. In the determination operation, if the differential pressure falls below the determination value, it can be determined that the valving element (55) is between the positions corresponding to the first and second states. That is, it can be determined that the four-way switching valve (20) is being switched. The switching determination section (59) outputs the low differential pressure signal to the capacity control section (51) if the differential pressure falls below the determination value.

The abnormality determination section (52) determines whether or not there is the abnormality in the second compressor (14b). The abnormality determination section (52) determines that the second compressor (14b) is in the abnormal state when, e.g., the high-pressure switch (38b) of the second discharge pipe (21b) is in operation.

Operation of Refrigeration Apparatus

The operation of the refrigeration apparatus (1) of Embodiment 1 will be described hereinafter. In the refrigeration apparatus (1), the four-way switching valve (20) switches between a cooling operation for cooling inside the internal units (60) and a defrosting operation for melting frost accumulated on the internal heat exchanger (64).

<Cooling Operation>

In the cooling operation, the four-way switching valve (20) is set to the first state. The first external expansion valve (18) is set so as to be fully closed. When operating the compression mechanism (40) under such a state, a vapor compression refrigeration cycle in which the external heat exchanger (15) functions as a condenser, and each of the internal heat exchangers (64) functions as an evaporator is performed in the refrigerant circuit (4). During the cooling operation, the opening of the second external expansion valve (19) and internal expansion valves (63) is adjusted as necessary.

Specifically, after the compression mechanism (40) is started, the refrigerant discharged from the compression mechanism (40) flows into the external heat exchanger (15) through the oil separator (33) and the four-way switching valve (20). In the external heat exchanger (15), the refrigerant is condensed by exchanging heat with external air. The refrigerant condensed in the external heat exchanger (15) is temporarily stored in the receiver (16), and flows into the second liquid pipe (25) through the high-pressure flow path (17*a*) of the super-cooling heat exchanger (17). A part of the refrigerant flows into the first branched pipe (26) from the second liquid pipe (25). The remaining refrigerant flows into the liquid-side connecting pipe (2).

A pressure of the refrigerant flowing into the first branched pipe (26) is reduced by the second external expansion valve (19), and then such refrigerant circulates in the low-pressure flow path (17*b*) of the super-cooling heat exchanger (17). In the super-cooling heat exchanger (17), the low-pressure refrigerant in the low-pressure flow path (17*b*) is evaporated by exchanging heat with the high-pressure refrigerant in the high-pressure flow path (17*a*). On the other hand, the refrigerant in the high-pressure flow path (17*a*) is super-cooled by releasing heat to the low-pressure refrigerant in the low-pressure flow path (17*b*). The gas refrigerant evaporated in the low-pressure flow path (17*b*) flows into the compression mechanism (40) through the gas injection pipe (30).

The refrigerant flowing into the liquid-side connecting pipe (2) is distributed to each of the internal circuits (61). Subsequently, the pressure of the refrigerant is reduced by the internal expansion valve (63), and then such refrigerant flows into the internal heat exchanger (64). In each of the internal heat exchangers (64), the refrigerant is evaporated by exchanging heat with internal air. The internal air is cooled by the refrigerant. After a flow of the refrigerant evaporated in the internal heat exchanger (64) joins a flow of the refrigerant from the other internal heat exchanger (64) at the gas-side connecting pipe (3), the refrigerant passes through the four-way switching valve (20) to be sucked into the compression mechanism (40).

<Defrosting Operation>

In the refrigeration apparatus (1), when an amount of frost accumulated on the internal heat exchanger (64) is increased during the cooling operation, the defrosting operation is performed in order to remove the frost. In the defrosting operation, defrosting is simultaneously performed in the internal heat exchangers (64).

In the defrosting operation, the four-way switching valve (20) is set to the second state. The internal expansion valves (63) are set so as to be fully opened. When operating the compression mechanism (40) under such a state, a vapor compression refrigeration cycle in which the external heat exchanger (15) functions as the evaporator, and each of the internal heat exchangers (64) functions as the condenser is performed in the refrigerant circuit (4). During the defrosting operation, the opening of the first external expansion valve (18) and second external expansion valve (19) is adjusted as necessary.

Specifically, after the compression mechanism (40) is started, the refrigerant discharged from the compression mechanism (40) flows into each of the internal heat exchangers (64) through the oil separator (33) and the four-way switching valve (20). In each of the internal heat exchangers (64), the accumulated frost is melted by the high-pressure refrigerant while cooling the refrigerant by the frost, resulting in condensing the refrigerant. The refrigerant condensed in the internal heat exchanger (64) is temporarily stored in the receiver (16), and then flows into the third branched pipe (29) through the second liquid pipe (25) and the first branched pipe (26). The pressure of the refrigerant flowing into the third branched pipe (29) is reduced by the first external expansion valve (18) of the third branched pipe (29), and then the refrigerant flows into the external heat exchanger (15). In the external heat exchanger (15), the refrigerant is evaporated by exchanging heat with external air. The refrigerant evaporated in the external heat exchanger (15) is sucked into the compression mechanism (40) through the four-way switching valve (20).

<Operation of Controller>

Figure 3:
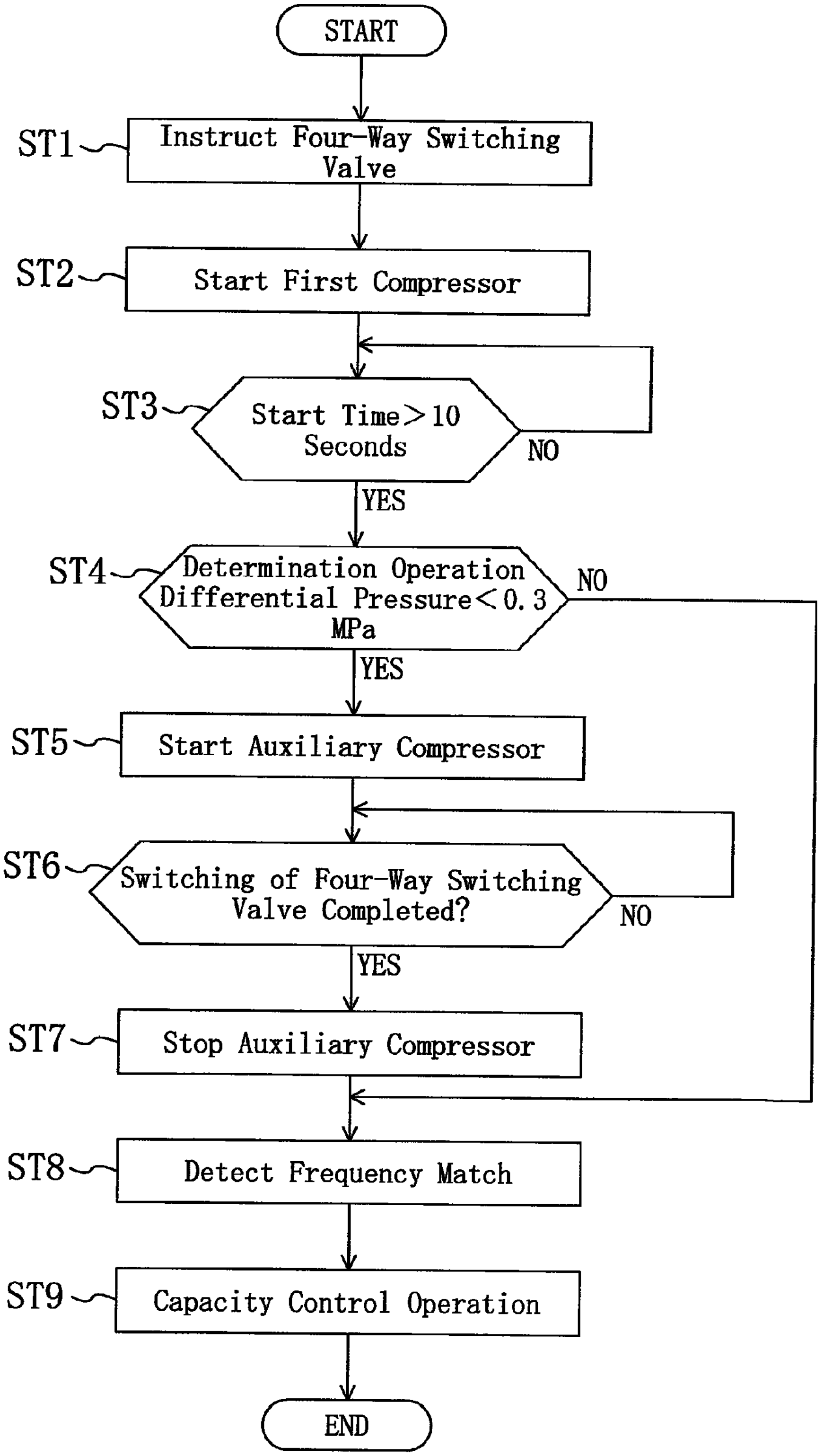
FIG. 3 is a flowchart illustrating an operation of a controller immediately after a compression mechanism is started in the refrigeration apparatus of Embodiment 1.

In the refrigeration apparatus (1) of the Embodiment 1, immediately after the compression mechanism (40) is started, the controller (50) is operated in order to shorten the time period required for switching the four-way switching valve (20). The operation of the controller (50) immediately after the compression mechanism (40) being started will be described hereinafter with reference to FIG. 3.

At ST1, the switching valve control section (58) outputs the switching signal to the four-way switching valve (20). Note that it is unclear whether the valving element (55) is at the position corresponding to the first state, at the position corresponding to the second state, or between the positions corresponding to the first and second states before starting the refrigeration apparatus (1). Thus, in order to set the four-way switching valve (20) to the first state, the switching valve control section (58) outputs the switching signal for setting the four-way switching valve (20) to the first state even if the valving element (55) is at the position corresponding to the first state. In addition, in order to set the four-way switching valve (20) to the second state, the switching valve control section (58) outputs the switching signal for setting the four-way switching valve (20) to the second state even if the valving element (55) is at the position corresponding to the second state. In the four-way switching valve (20), the communication states of the three gas pipes (41, 42, 43) of the pilot valve (54) are adjusted depending on the switching signal from the switching valve control section (58).

Subsequently, at ST2, the capacity control section (51) starts only the first compressor (14*a*) of the compression mechanism (40) at the time when X seconds (e.g., X=5 seconds) is elapsed after completion of ST1. When starting the first compressor (14*a*), the capacity control section (51) sets the operating capacity of the first compressor (14*a*) to the lowest of the plurality of the operating capacity levels. The first compressor (14*a*) is started at the lowest operating capacity level.

Subsequently, at ST3, the switching determination section (59) determines whether or not Y seconds (e.g., Y=10 seconds) have elapsed since the compression mechanism (40) was started. If Y seconds have elapsed since the compression mechanism (40) was started, the process proceeds to ST4. If Y seconds have not elapsed since the compression mechanism (40) was started, the process repeats ST3.

At ST4, the switching determination section (59) executes the determination operation. In the determination operation, it is determined whether or not the differential pressure calculated based on the difference between the detected values of the high-pressure sensor (35) and of the low-pressure sensor (36) falls below the determination value (e.g., 0.3 MPa).

At this point, immediately after the compression mechanism (40) is started, the operating capacity of the first compressor (14*a*) is set to the lowest level. Thus, it is unlikely to produce the pressure difference between the cylinder chamber (48) on the left side and the cylinder chamber (49) on the right side of the four-way switching valve. This does not allow the valving element (55) to quickly move when switching the four-way switching valve (20) based on the switching signal. Consequently, the valving element (55) may be between the positions corresponding to the first and second states upon the determination operation. In four-way switching valve (20), the valving element (55) may be stopped between the positions corresponding to the first and second states.

In such a case, the first port (P1) communicates with the third port (P3) in the four-way switching valve (20), thereby decreasing the differential pressure as compared with that when not switching the four-way switching valve (20). Thus, if the differential pressure falls below the determination value, it can be determined that the first port (P1) communicates with the third port (P3) in the four-way switching valve (20), and that the four-way switching valve (20) is being switched. The switching determination section (59) outputs the low differential pressure signal to the capacity control section (51) if the differential pressure falls below the determination value. Subsequently, the process proceeds to ST5.

The determination operation is performed after a predetermined period of time (in the present embodiment, 10 seconds) has elapsed since the first compressor (14*a*) was started. Even in the case where the four-way switching valve (20) is not switched, the differential pressure does not reach the value comparable to the operating capacity of the compression mechanism (40) immediately after the first compressor (14*a*) is started. Thus, immediately after the first compressor (14*a*) is started, it is difficult to determine whether or not the four-way switching valve (20) is being switched, based on the differential pressure. In the present embodiment, in order to precisely determine whether or not the four-way switching valve (20) is being switched, the determination operation is performed after the predetermined period of time has elapsed since the first compressor (14*a*) was started.

At ST5, the abnormality determination section (52) first determines whether or not there is the abnormality in the second compressor (14*b*). If the abnormality determination section (52) determines that there is no abnormality in the second compressor (14*b*), the capacity control section (51) starts the second compressor (14*b*) as the auxiliary compressor. Conversely, if the abnormality determination section (52) determines that there is the abnormality in the second compressor (14*b*), the capacity control section (51) starts the third compressor (14*c*) as the auxiliary compressor.

When starting the auxiliary compressor, an entire operating capacity of the compression mechanism (40) increases by the operating capacity of the auxiliary compressor. Since the auxiliary compressor has the fixed operating capacity, the maximum operating capacity of the auxiliary compressor is added to the operating capacity of the compression mechanism (40), thereby significantly increasing the operating capacity of the compression mechanism (40). Thus, the valving element (55) of the four-way switching valve (20) quickly moves after the auxiliary compressor being started, thereby significantly shortening the time period for which the four-way switching valve (20) is being switched, represented by the small differential pressure. After completion of ST5, the process proceeds to ST6.

At ST6, the switching determination section (59) performs a completion determination operation for determining whether or not the switching of the four-way switching valve (20) is completed. In the completion determination operation, the switching determination section (59) outputs a switching completion signal to the capacity control section (51) if any one of the following conditions is satisfied: a first condition under which the differential pressure exceeds a predetermined value (e.g., 0.5 MPa); a second condition under which the detected value of the high-pressure sensor (35) exceeds a predetermined value (e.g., 2.6 MPa); and a third condition under which Z seconds (e.g., Z=20 seconds) have elapsed since the auxiliary compressor was started. The switching completion signal is outputted when the first port (P1) does not communicate with the third port (P3) in the four-way switching valve (20), i.e., when the switching of the four-way switching valve (20) is completed. The first, second, and third conditions constitute a completion condition. After the switching completion signal is outputted, the process proceeds to ST7. If any of the first, second, and third conditions are not satisfied, the process repeats ST6.

At ST7, the capacity control section (51) stops the auxiliary compressor. That is, when the switching determination section (59) outputs the switching completion signal, the auxiliary compressor is stopped. If the second compressor (14*b*) is started at ST5, the capacity control section (51) stops the second compressor (14*b*). If the third compressor (14*c*) is started at ST5, the capacity control section (51) stops the third compressor (14*c*). After completion of ST7, only the first compressor (14*a*) is in operation. The operating capacity of the first compressor (14*a*) is maintained constant after starting thereof.

Subsequently, at ST8, the capacity control section (51) detects whether or not an operating frequency of the first compressor (14*a*) matches a frequency instructed at ST2. At ST9, the capacity control section (51) initiates a capacity control operation for controlling the operating capacity of the compression mechanism (40) depending on the required operating capacity, thereby increasing the operating capacity of the first compressor (14*a*).

In the capacity control operation, if the required operating capacity is less than or equal to the maximum operation capacity of the first compressor (14*a*), the capacity control section (51) controls the operating capacity of the first compressor (14*a*) with only the first compressor (14*a*) being operated. If the required operating capacity exceeds the maximum operating capacity of the first compressor (14*a*), and is less than or equal to a total of the maximum operating capacity of the first compressor (14*a*) and the operating capacity of the second compressor (14*b*), the capacity control section (51) controls the operating capacity of the first compressor (14*a*) with the first compressor (14*a*) and the second compressor (14*b*) being operated. If the required operating capacity exceeds the total of the maximum operating capacity of the first compressor (14*a*) and the operating capacity of the second compressor (14*b*), the capacity control section (51) controls the operating capacity of the first compressor (14*a*) with all of the compressors (14*a*, 14*b*, 14*c*) being operated.

Advantages of Embodiment 1

In Embodiment 1, only the first compressor (14*a*) is started as a start-up of the compression mechanism (40), and the second compressor (14*b*) is started if the differential pressure falls below the determination value in the determination operation after the first compressor (14*a*) being started. The second compressor (14*b*) is started when the four-way switching valve (20) is being switched. When starting the second compressor (14*b*), the entire operating capacity of the compression mechanism (40) increases by the operating capacity of the second compressor (14*b*). Since the second compressor (14*b*) has the fixed operating capacity, the maximum operating capacity of the second compressor (14*b*) is added to the operating capacity of the compression mechanism (40), thereby significantly increasing the operating capacity of the compression mechanism (40). Thus, the valving element of the four-way switching valve (20) quickly moves after the second compressor (14*b*) being started, thereby shortening the time period required for switching the four-way switching valve (20) when starting the compression mechanism (40).

In addition, the operating capacity of the first compressor (14*a*) is maintained constant until the determination operation is completed, thereby making the differential pressure unsusceptible to the change in the operating capacity of the first compressor (14*a*) in the determination operation in Embodiment 1. Thus, in the determination operation, it can be precisely determined whether or not the four-way switching valve (20) is being switched.

In Embodiment 1, if the abnormality determination section (52) determines that the second compressor (14*b*) is in the abnormal state, and the differential pressure falls below the determination value in the determination operation, the third compressor (14*c*) is started instead of starting the second compressor (14*b*). Consequently, even if there is the abnormality in the second compressor (14*b*), the operating capacity of the compression mechanism (40) is significantly increased, thereby shortening the time period required for switching the four-way switching valve (20) when starting the compression mechanism (40).

In Embodiment 1, the first compressor (14*a*) is a compressor in which an amount of oil supplied to the sliding portion is dependent upon the magnitude of the differential pressure. Thus, a time period for which the amount of oil supplied to the sliding portion is reduced in the first compressor (14*a*) can be shortened with the shortening of the time period required for switching the four-way switching valve (20) when starting the compression mechanism (40). Consequently, the state of the oil supply in the first compressor (14*a*) when starting the compression mechanism (40) can be improved.

Embodiment 2

Embodiment 2 of the present invention will be described.

<Entire Structure of Refrigeration Apparatus>

Figure 4:
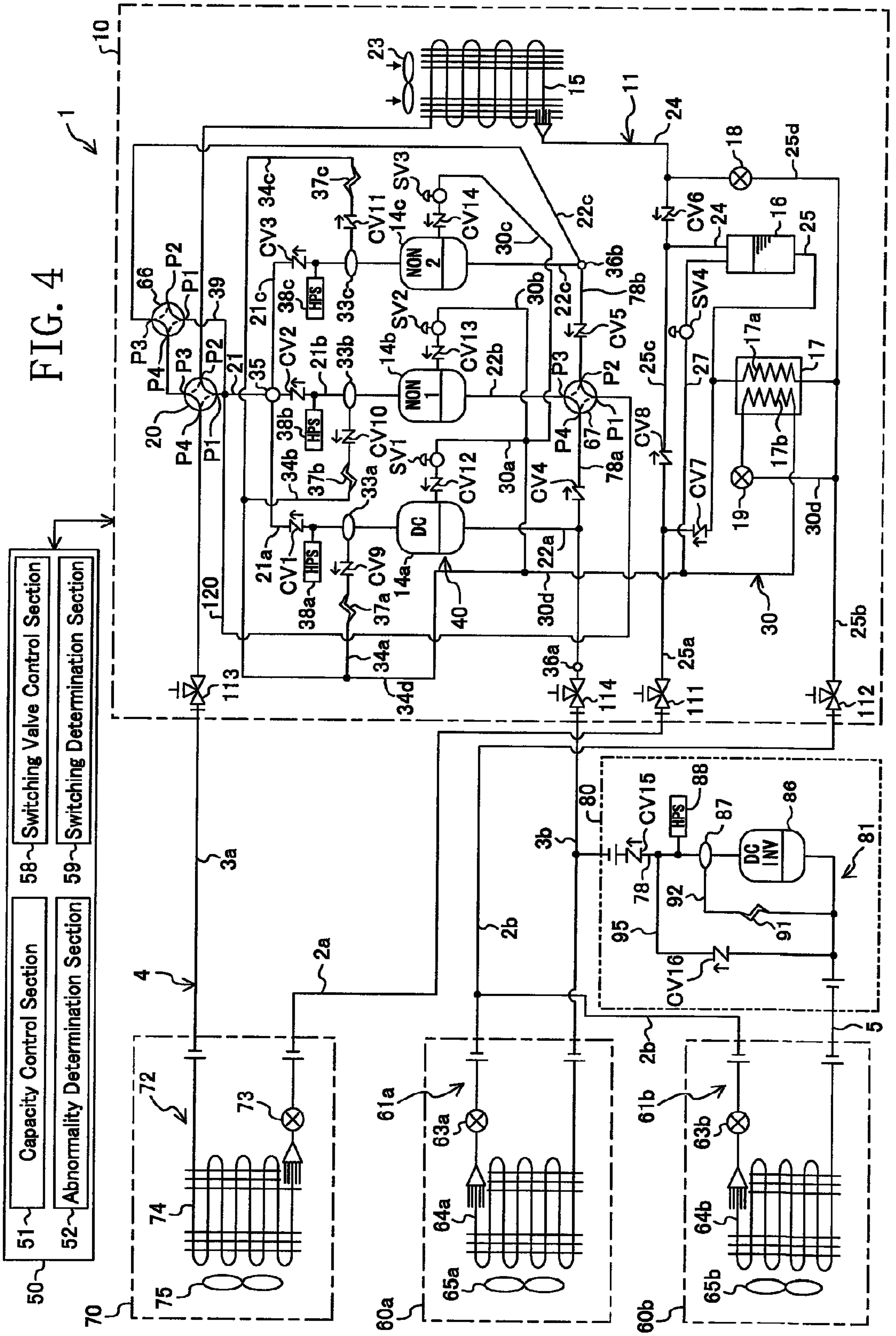
FIG. 4 is a refrigerant circuit diagram of a refrigeration apparatus of Embodiment 2 of the present invention.

Embodiment 2 relates to a refrigeration apparatus (1) of the present invention. The refrigeration apparatus (1) is provided, e.g., at convenience stores. As illustrated in FIG. 4, the refrigeration apparatus (1) includes an outdoor unit (10); an indoor unit (70) for air-conditioning an indoor space; two internal units (60*a*, 60*b*) for cooling inside a refrigerator; and a booster unit (80). The two internal units (60*a*, 60*b*) are a first internal unit (60*a*) for refrigeration; and a second internal unit (60*b*) for freezing.

The external unit (10), the indoor unit (70), the first internal unit (60*a*), the second internal unit (60*b*), and the booster unit (80) are provided with an outdoor circuit (11), an indoor circuit (72), a first internal circuit (61*a*), a second internal circuit (61*b*), and a booster circuit (81), respectively. In the refrigeration apparatus (1), the outdoor circuit (11), the indoor circuit (72), the first internal circuit (61*a*), the second internal circuit (61*b*), and the booster circuit (81) are connected to each other through four connecting pipes (2*a*, 2*b*, 3*a*, 3*b*), thereby forming a refrigerant circuit (4) in which a vapor compression refrigeration cycle is performed. The first internal circuit (61*a*) and the second internal circuit (61*b*) are connected in parallel. The second internal circuit (61*b*) and the booster circuit (81) are connected in series.

The four connecting pipes (2*a*, 2*b*, 3*a*, 3*b*) are a first liquid-side connecting pipe (2*a*); a second liquid-side connecting pipe (2*b*); a first gas-side connecting pipe (3*a*); and a second gas-side connecting pipe (3*b*). One end of the first liquid-side connecting pipe (2*a*) is connected to a first liquid-side stop valve (111) of the outdoor circuit (11), and the other end is connected to the indoor circuit (72). One end of the second liquid-side connecting pipe (2*b*) is connected to a second liquid-side stop valve (112) of the outdoor circuit (11), and the other end branches into two paths to be connected to the first internal circuit (61*a*) and the second internal circuit (61*b*). One end of the first gas-side connecting pipe (3*a*) is connected to a first gas-side stop valve (113) of the outdoor circuit (11), and the other end is connected to the indoor circuit (72). One end of the second gas-side connecting pipe (3*b*) is connected to a second gas-side stop valve (114) of the outdoor circuit (11), and the other end branches into two paths to be connected to the first internal circuit (61*a*) and the second internal circuit (61*b*). The second internal circuit (61*b*) and the booster circuit (81) are connected to each other through a connecting gas pipe (5).

<<Outdoor Unit>>

The outdoor circuit (11) includes a compression mechanism (40); an outdoor heat exchanger (15); and a receiver (16). The compression mechanism (40) is constituted by a first compressor (14*a*), a second compressor (14*b*), and a third compressor (14*c*). The first compressor (14*a*) is the same as the first compressor (14*a*) of the Embodiment 1. The second compressor (14*b*) and the third compressor (14*c*) are the same as the second compressor (14*b*) and the third compressor (14*c*) in Embodiment 1. In the compression mechanism (40), discharge sides of these compressors (14*a*, 14*b*, 14*c*) are connected to each other. In addition, suction sides of these compressors (14*a*, 14*b*, 14*c*) are connected to a third four-way switching valve (67) which is described later.

The first compressor (14*a*) functions as an internal compressor for sucking refrigerant evaporated in the internal units (60*a*, 60*b*). The first compressor (14*a*) is a compressor which is used only for the refrigerator. The third compressor (14*c*) functions as an indoor compressor for sucking refrigerant evaporated in the indoor unit (70) during an air-cooling operation. The third compressor (14*c*) is a compressor which is used only for an indoor space. The second compressor (14*b*) functions as the internal compressor when the third four-way switching valve (67) which is described later, is in a first state; and functions as the indoor compressor when the third four-way switching valve (67) is in a second state. That is, the second compressor (14*b*) functions as both of internal and indoor compressors.

A first discharge pipe (21*a*) of the first compressor (14*a*), a second discharge pipe (21*b*) of the second compressor (14*b*), and a third discharge pipe (21*c*) of the third compressor (14*c*) are connected to a single discharge junction pipe (21). The discharge junction pipe (21) is connected to a first four-way switching valve (20). A branched discharge pipe (39) is branched from the discharge junction pipe (21). The branched discharge pipe (39) is connected to a second four-way switching valve (66).

In the discharge pipes (21*a*, 21*b*, 21*c*), oil separators (33*a*, 33*b*, 33*c*), high-pressure switches (38*a*, 38*b*, 38*c*), and check valves (CV1, CV2, CV3) are arranged in sequence from a compressor (14) side. The high-pressure switches (38) immediately stop the compressors (14) under abnormally-high pressure. The check valves (CV1, CV2, CV3) stop refrigerant from flowing toward the compressors (14).

The oil separators (33) are formed in a hermetic-container-like shape, and separate refrigerating machine oil from refrigerant discharged from the compressors (14). A first oil return pipe (34*a*), a second oil return pipe (34*b*), and a third oil return pipe (34*c*) are connected to the first oil separator (33*a*) of the first discharge pipe (21*a*), the second oil separator (33*b*) of the second discharge pipe (21*b*), and the third oil separator (33*c*) of the third discharge pipe (21*c*), respectively. The first oil return pipe (34*a*), the second oil return pipe (34*b*), and the third oil return pipe (34*c*) are connected to an oil-return junction pipe (34*d*) leading to a main injection pipe (30*d*) which is described later. In the oil return pipes (34*a*, 34*b*, 34*c*), check valves (CV9, CV10, CV11) for stopping refrigerating machine oil from flowing back to an oil separator (33) side; and capillary tubes (37*a*, 37*b*, 37*c*) for reducing a pressure of the high-pressure refrigerating machine oil to an intermediate pressure are arranged in sequence from the oil separator (33) side.

A first suction pipe (22*a*) of the first compressor (14*a*) is connected to the second gas-side stop valve (114). A second suction pipe (22*b*) of the second compressor (14*b*) is connected to the third four-way switching valve (67). A third suction pipe (22*c*) of the third compressor (14*c*) is connected to the second four-way switching valve (66). A first branched suction pipe (78*a*) is branched from the first suction pipe (22*a*). A second branched suction pipe (78*b*) is branched from the third suction pipe (22*c*). The first branched suction pipe (78*a*) and the second branched suction pipe (78*b*) are connected to the third four-way switching valve (67). The first branched suction pipe (78*a*) and the second branched suction pipe (78*b*) are provided with check valves (CV4, CV5) for stopping refrigerant from flowing from a third four-way switching valve (67) side.

The outdoor heat exchanger (15) is a cross-fin-type fin-and-tube heat exchanger. The outdoor heat exchanger (15) functions as a heat-source-side heat exchanger. An outdoor fan (23) for sending outdoor air to the outdoor heat exchanger (15) is provided near the outdoor heat exchanger (15). In the outdoor heat exchanger (15), heat is exchanged between refrigerant and outdoor air.

A gas side of the outdoor heat exchanger (15) is connected to the first four-way switching valve (20). A liquid side of the outdoor heat exchanger (15) is connected to a top portion of the receiver (16) through a first liquid pipe (24). The first liquid pipe (24) is provided with a check valve (CV6) for stopping refrigerant from flowing toward the outdoor heat exchanger (15).

The receiver (16) is formed in a vertically-elongated hermetic-container-like shape. The high-pressure refrigerant condensed in the outdoor heat exchanger (15), etc., is temporarily stored in the receiver (16). In addition to the first liquid pipe (24), a degassing pipe (27) provided with an openable and closable solenoid valve (SV4) is connected to the top portion of the receiver (16). One end of a second liquid pipe (25) is connected to a bottom portion of the receiver (16). The other end of the second liquid pipe (25) branches into a first branched liquid pipe (25*a*) and a second branched liquid pipe (25*b*).

The first branched liquid pipe (25*a*) is connected to the first liquid-side stop valve (111). The first branched liquid pipe (25*a*) communicates with the indoor circuit (72) through the first liquid-side connecting pipe (2*a*). The first branched liquid pipe (25*a*) is provided with a check valve (CV7) for stopping refrigerant from flowing toward the second liquid pipe (25). A third branched liquid pipe (25*c*) connected to the first liquid pipe (24) between the check valve (CV6) and the receiver (16) is branched from the first branched liquid pipe (25*a*). The third branched liquid pipe (25*c*) is provided with a check valve (CV8) for stopping refrigerant from flowing toward the first branched liquid pipe (25*a*).

The second branched liquid pipe (25*b*) is connected to the second liquid-side stop valve (112). The second branched liquid pipe (25*b*) communicates with the internal circuits (61*a*, 61*b*) through the second liquid-side connecting pipe (2*b*). The second branched liquid pipe (25*b*) is provided with a cooling heat exchanger (17). The second branched liquid pipe (25*b*) branches into a fourth branched liquid pipe (25*d*) and an injection pipe (30).

The fourth branched liquid pipe (25*d*) is branched between the cooling heat exchanger (17) and the second liquid-side stop valve (112). An end of the fourth branched liquid pipe (25*d*), which is not connected to the second branched liquid pipe (25*b*), is connected to the first liquid pipe (24) between the outdoor heat exchanger (15) and the check valve (CV6). A first outdoor expansion valve (18) which is an electronic expansion valve with variable opening is provided in the fourth branched liquid pipe (25*d*).

The injection pipe (30) is branched between a branching point of the fourth branched liquid pipe (25*d*) and the second liquid-side stop valve (112). The injection pipe (30) includes the main injection pipe (30*d*) extending from the second branched liquid pipe (25*b*); a first branched injection pipe (30*a*) which is branched from the main injection pipe (30*d*) to be connected to an intermediate-pressure compression chamber of the first compressor (14*a*); a second branched injection pipe (30*b*) which is branched from the main injection pipe (30*d*) to be connected to an intermediate-pressure compression chamber of the second compressor (14*b*); and a third branched injection pipe (30*c*) which is branched from the main injection pipe (30*d*) to be connected to an intermediate-pressure compression chamber of the third compressor (14*c*).

In the main injection pipe (30*d*), a second outdoor expansion valve (19) which is an electronic expansion valve with variable opening, and a super-cooling heat exchanger (17) which is the same as the super-cooling heat exchanger of Embodiment 1 are arranged in sequence from a second branched liquid pipe (25*b*) side. In each of the branched injection pipes (30*a*, 30*b*, 30*c*), a check valve (CV12, CV13, CV14) for stopping refrigerant from flowing toward the main injection pipe (30*d*), and an openable and closable solenoid valve (SV1, SV2, SV3) are arranged in sequence from the compressor (14) side.

In the first four-way switching valve (20), a first port (P1), a second port (P2), a third port (P3), and a fourth port (P4) are connected to the discharge junction pipe (21), the outdoor heat exchanger (15), a fourth port (P4) of the second four-way switching valve (66), and the first gas-side stop valve (113), respectively. In the second four-way switching valve (66), a first port (P1), a third port (P3), and the fourth port (P4) are connected to the branched discharge pipe (39), the third suction pipe (22*c*), and the third port (P3) of the first four-way switching valve (20), respectively. A second port (P2) of the second four-way switching valve (66) is a closed port. In the third four-way switching valve (67), a first port (P1), a second port (P2), a third port (P3), and a fourth port (P4) are connected to a high-pressure pipe (120) connected to the discharge junction pipe (21), the second branched suction pipe (78*b*), the third suction pipe (22*c*), and the first branched suction pipe (78*a*), respectively.

Each of the first to third four-way switching valves (20, 66, 67) is switchable between a first state (indicated by a solid line in FIG. 4) in which the first port (P1) communicates with the second port (P2) with the third port (P3) communicating with the fourth port (P4), and a second state (indicated by a dashed line in FIG. 4) in which the first port (P1) communicates with the fourth port (P4) with the second port (P2) communicating with the third port (P3). Each of the first to third four-way switching valves (20, 66, 67) has the same structure as that of the four-way switching valve (20) of Embodiment 1.

In the first four-way switching valve (20), and the second four-way switching valve (66), the first port (P1) functions as a high-pressure port (P1) communicating with a discharge side of the compression mechanism (40), and the third port (P3) functions as a low-pressure port (P3) communicating with a suction side of the compression mechanism (40).

The outdoor circuit (11) includes a high-pressure sensor (35); a first low-pressure sensor (36*a*); and a second low-pressure sensor (36*b*). The high-pressure sensor (35) is provided at an upstream end of the discharge junction pipe (21). The first low-pressure sensor (36*a*) is provided in the first suction pipe (22*a*). The second low-pressure sensor (36*b*) is provided in the third suction pipe (22*c*). Detected values of the high-pressure sensor (35) and of low-pressure sensors (36*a*, 36*b*) are outputted to a controller (50).

<<Indoor Unit>>

In the indoor circuit (72), an indoor expansion valve (73) and an indoor heat exchanger (74) are arranged in sequence from a liquid-side end toward a gas-side end. The indoor expansion valve (73) is an electronic expansion valve with adjustable opening. The indoor heat exchanger (74) is a cross-fin-type fin-and-tube heat exchanger. An indoor fan (75) for sending indoor air to the indoor heat exchanger (74) is provided near the indoor heat exchanger (74). In the indoor heat exchanger (74), heat is exchanged between refrigerant and indoor air.

<<Internal Unit>>

In the first internal circuit (61*a*) and the second internal circuit (61*b*), internal expansion valves (63*a*, 63*b*) and internal heat exchangers (64*a*, 64*b*) are arranged in sequence from a liquid-side end toward a gas-side end. Each of the internal expansion valves (63*a*, 63*b*) is an electronic expansion valve with adjustable opening. Each of the internal heat exchangers (64*a*, 64*b*) is a cross-fin-type fin-and-tube heat exchanger. Internal fans (65*a*, 65*b*) for sending internal air to the internal heat exchangers (64*a*, 64*b*) are provided near the internal heat exchangers (64*a*, 64*b*). In each of the internal heat exchangers (64*a*, 64*b*), heat is exchanged between refrigerant and internal air.

<<Booster Unit>>

A booster compressor (86) with variable operating capacity is provided in the booster circuit (81). In a discharge pipe (78) of the booster compressor (86), an oil separator (87), a high-pressure switch (88), and a check valve (CV15) are arranged in sequence from a booster compressor (86) side. An oil return pipe (92) provided with a capillary tube (91) is connected to the oil separator (87). A bypass pipe (95) for bypassing the booster compressor (86) is provided in the booster circuit (81). A check valve (CV16) is provided in the bypass pipe (95).

<Structure of Controller>

As in Embodiment 1, the controller (50) including a capacity control section (51), a switching valve control section (58), a switching determination section (59), and an abnormality determination section (52) is provided in the refrigeration apparatus (1) of Embodiment 2. Points different from Embodiment 1 will be mainly described hereinafter.

The capacity control section (51) controls an operating capacity of the compression mechanism (40) depending on an operating capacity to be required. Specifically, when an internal load is relatively small, which is a total of cooling load in the refrigeration-side and freezing-side internal heat exchangers (64*a*, 64*b*), the capacity control section (51) operates only the first compressor (14*a*) as the internal compressor, thereby adjusting the operating capacity of the first compressor (14*a*) depending on the internal load. When the internal load exceeds the maximum operating capacity of the first compressor (14*a*), the capacity control section (51) switches the second compressor (14*b*) to function as the internal compressor if the second compressor (14*b*) functions as the indoor compressor; or the capacity control section (51) starts the second compressor (14*b*) if the second compressor (14*b*) is stopped. As a result, the capacity control section (51) operates the first compressor (14*a*) and the second compressor (14*b*) as the internal compressor, thereby adjusting the operating capacity of the first compressor (14*a*) depending on the internal load.

When initiating a refrigerating/freezing operation and a first cooling/air-heating operation which are described later, the capacity control section (51) starts only the first compressor (14*a*) of the compressors (14) of the compression mechanism (40). The capacity control section (51) sets the operating capacity of the first compressor (14*a*) to the lowest of a plurality of operating capacity levels when starting the first compressor (14*a*).

When starting only the first compressor (14*a*) as the start-up of the compression mechanism (40), if the switching determination section (59) outputs a low differential pressure signal, the capacity control section (51) starts the second compressor (14*b*) as an auxiliary compressor as in Embodiment 1. Note that, in Embodiment 2, the third compressor (14*c*) is not started as the auxiliary compressor even if the abnormality determination section (52) determines that there is an abnormality in the second compressor (14*b*).

If only the first compressor (14*a*) of the compressors (14) of the compression mechanism (40) is started, the switching determination section (59) performs the determination operation similar to that of Embodiment 1 immediately after the first compressor (14*a*) is started. The switching determination section (59) detects a difference between the detected values of the high-pressure sensor (35) and of the first low-pressure sensor (36*a*) as a differential pressure. If the differential pressure falls below the determination value, the switching determination section (59) outputs the low differential pressure signal.

Operations

Next, each type of operations performed by the refrigeration apparatus (1) will be described. Seven types of operation modes can be set in the refrigeration apparatus (1). Specifically, the following modes are settable: <i> an air-cooling operation only for cooling air by the indoor unit (70); <ii> an air-heating operation only for heating air by the indoor unit (70); <iii> a refrigerating/freezing operation only for cooling an inside space by the first internal unit (60*a*) and the second internal unit (60*b*); <iv> a cooling/air-cooling operation for cooling an inside space by the first internal unit (60*a*) and the second internal unit (60*b*), and for cooling air by the indoor unit (70); <v> a first cooling/air-heating operation for cooling an inside space by the first internal unit (60*a*) and the second internal unit (60*b*), and for heating air by the indoor unit (70), without using the outdoor heat exchanger (15); <vi> a second cooling/air-heating operation performed when there is excess air-heating capacity of the indoor unit (70) in the first cooling/air-heating operation; and <vii> a third cooling/air-heating operation performed when the air-heating capacity of the indoor unit (70) is insufficient in the first cooling/air-heating operation.

<Air-Cooling Operation>

Figure 5:
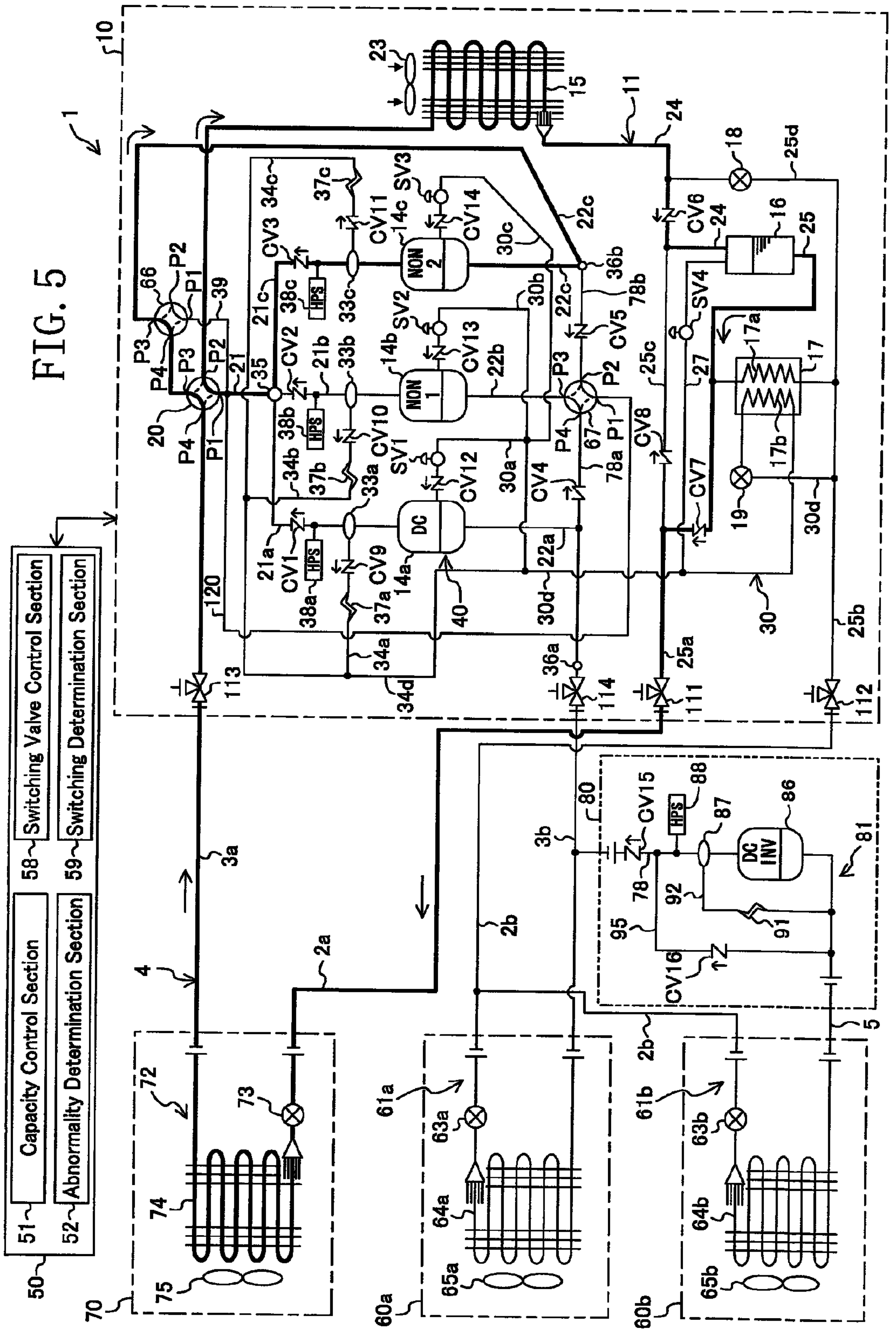
FIG. 5 is a refrigerant circuit diagram illustrating refrigerant flow during an air-cooling operation in Embodiment 2.

As illustrated in FIG. 5, in the air-cooling operation, the third compressor (14*c*) is operated with the first four-way switching valve (20) and the second four-way switching valve (66) being set to the first state. Each of the internal expansion valves (63) is set so as to be closed. In the air-cooling operation, a vapor compression refrigeration cycle is performed, in which the outdoor heat exchanger (15) functions as the condenser, and the indoor heat exchanger (74) functions as the evaporator. In the air-cooling operation, if air-cooling capacity is insufficient, the second compressor (14*b*) is also operated. At this point, the third four-way switching valve (67) is set to the second state, and the second compressor (14*b*) functions as the indoor compressor. The first compressor (14*a*) is stopped during the air-cooling operation.

Specifically, in the air-cooling operation, refrigerant discharged from the third compressor (14*c*) is condensed in the outdoor heat exchanger (15), and then flows into the indoor circuit (72) through the receiver (16). After a pressure of the refrigerant flowing into the indoor circuit (72) is reduced by the indoor expansion valve (73), such refrigerant is evaporated by absorbing heat from indoor air in the indoor heat exchanger (74). The indoor air cooled by the refrigerant is supplied to an indoor space. The refrigerant evaporated in the indoor heat exchanger (74) is sucked into the third compressor (14*c*) to be discharged again. An evaporation temperature of the refrigerant in the indoor heat exchanger (74) is, e.g., approximately 10° C.

<Air-Heating Operation>

Figure 6:
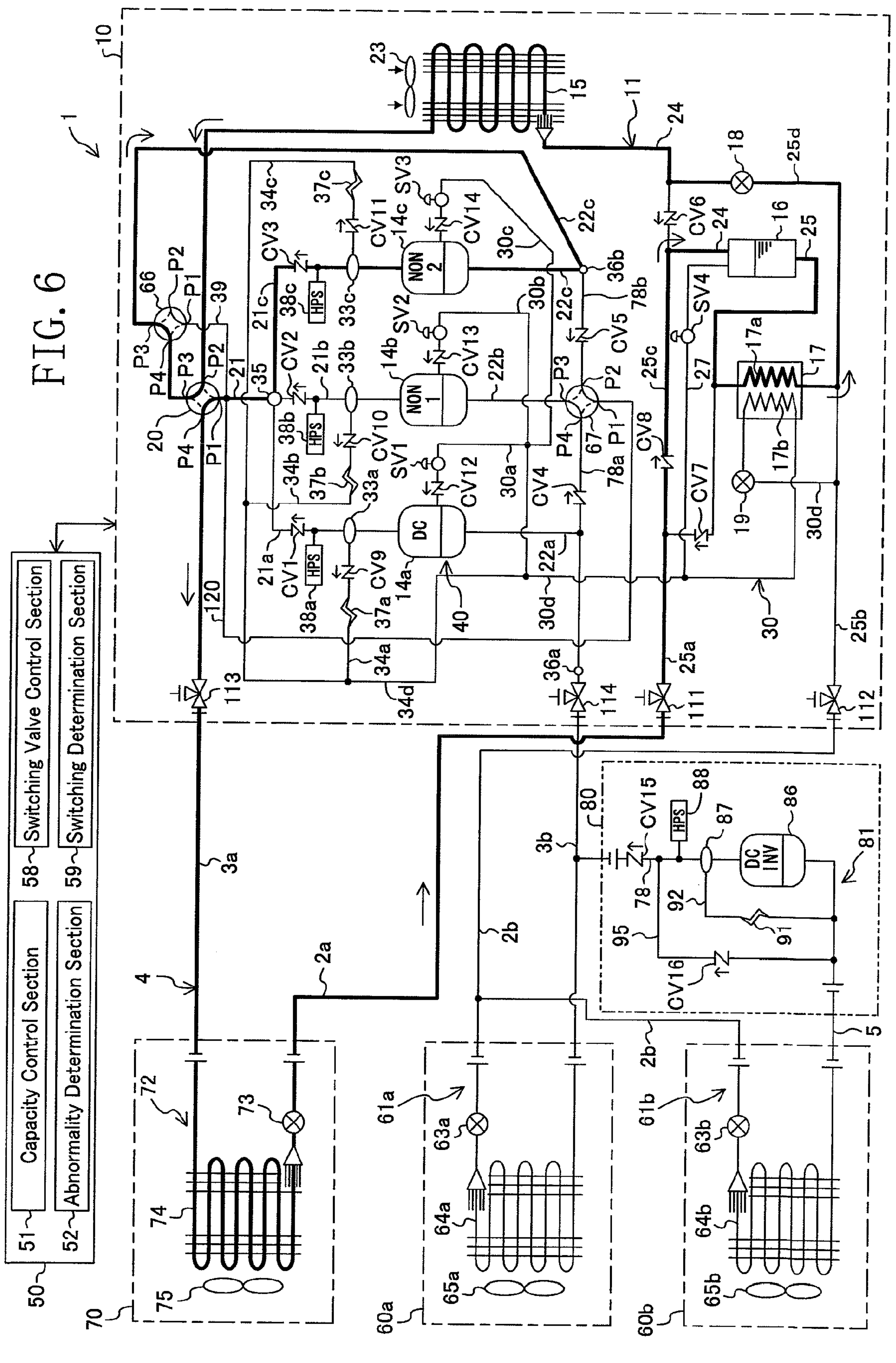
FIG. 6 is a refrigerant circuit diagram illustrating refrigerant flow during an air-heating operation in Embodiment 2.

As illustrated in FIG. 6, in the air-heating operation, the third compressor (14*c*) is operated with the first four-way switching valve (20) being set to the second state, and with the second four-way switching valve (66) being set to the first state. Each of the internal expansion valves (63) is set so as to be closed. In the air-heating operation, a vapor compression refrigeration cycle is performed, in which the indoor heat exchanger (74) functions as the condenser, and the outdoor heat exchanger (15) functions as the evaporator. In the air-heating operation, if the air-heating capacity is insufficient, the second compressor (14*b*) is also operated. At this point, the third four-way switching valve (67) is set to the second state. The first compressor (14*a*) is stopped during the air-heating operation.

Specifically, refrigerant discharged from the third compressor (14*c*) flows into the indoor circuit (72), and then is condensed by releasing heat to indoor air in the indoor heat exchanger (74). The indoor air heated by the refrigerant is supplied to an indoor space. After a pressure of the refrigerant condensed in the indoor heat exchanger (74) is reduced by the first outdoor expansion valve (18), such refrigerant is evaporated in the outdoor heat exchanger (15), and then is sucked into the third compressor (14*c*) to be discharged again.

<Refrigerating/Freezing Operation>

Figure 7:
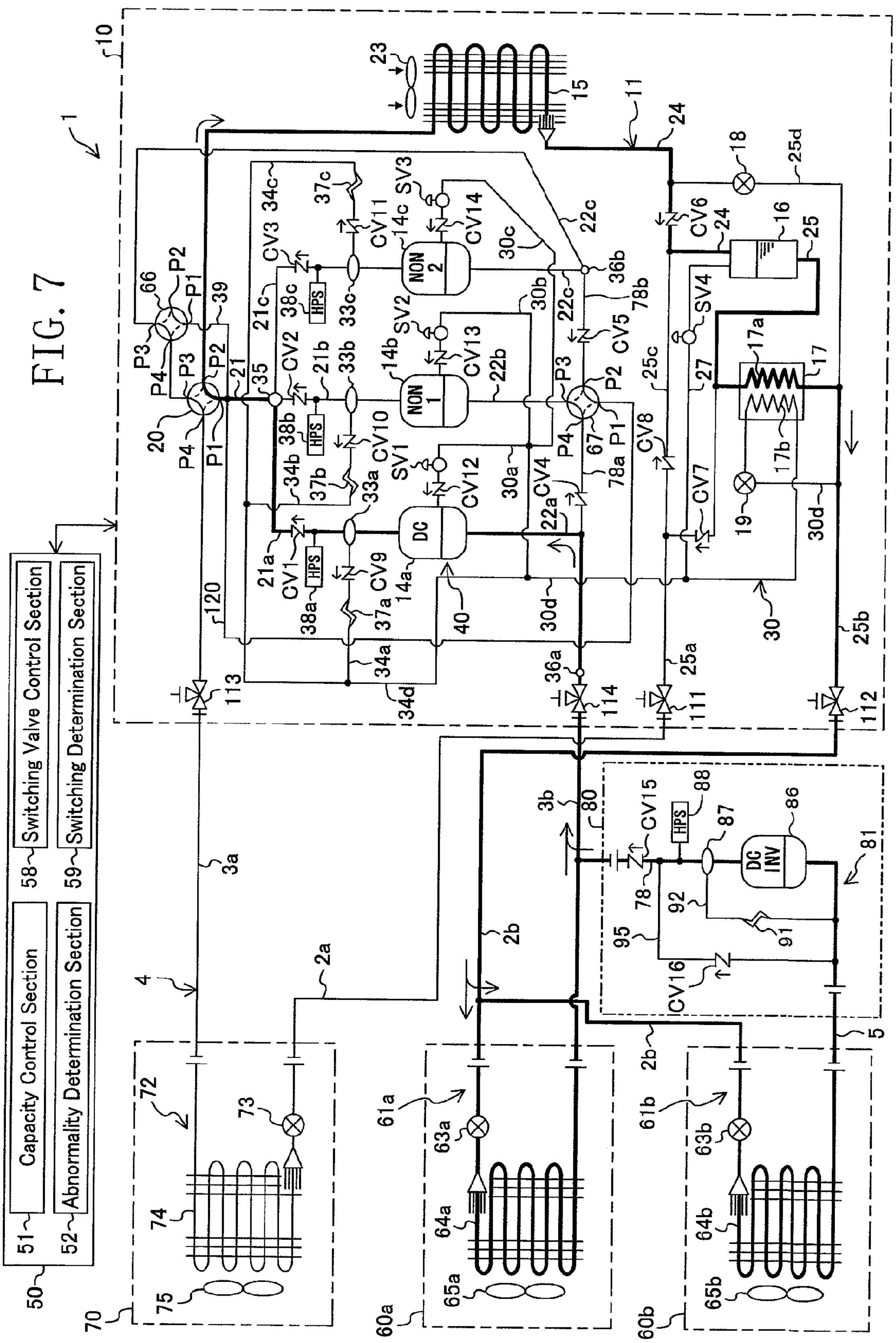
FIG. 7 is a refrigerant circuit diagram illustrating refrigerant flow during a refrigerating/freezing operation in Embodiment 2.

As illustrated in FIG. 7, in the refrigerating/freezing operation, the first compressor (14*a*) is operated with the first four-way switching valve (20) being set to the first state. The indoor expansion valve (73) is set so as to be closed. In the refrigerating/freezing operation, a vapor compression refrigeration cycle is performed, in which the outdoor heat exchanger (15) functions as the condenser, and each of the internal heat exchangers (64) functions as the evaporator. In the refrigerating/freezing operation, if the cooling capacity in the refrigerator is insufficient, the second compressor (14*b*) is also operated. At this point, the third four-way switching valve (67) is set to the first state, and the second compressor (14*b*) functions as the internal compressor. The third compressor (14*c*) is stopped during the refrigerating/freezing operation.

Specifically, in the refrigerating/freezing operation, refrigerant discharged from the first compressor (14*a*) is condensed in the outdoor heat exchanger (15). Subsequently, the refrigerant condensed in the outdoor heat exchanger (15) is distributed to the first internal circuit (61*a*) and the second internal circuit (61*b*) through the receiver (16).

After a pressure of the refrigerant flowing into the first internal circuit (61*a*) is reduced by the internal expansion valve (63*a*), such refrigerant is evaporated by absorbing heat from internal air in the internal heat exchanger (64*a*). The internal air cooled by the refrigerant is supplied to an inside space of a refrigeration showcase. Meanwhile, after a pressure of the refrigerant flowing into the second internal circuit (61*b*) is reduced by the internal expansion valve (63*b*), such refrigerant is evaporated by absorbing heat from internal air in the internal heat exchanger (64*b*). The internal air cooled by the refrigerant is supplied to an inside space of a freezing showcase. The refrigerant evaporated in the internal heat exchanger (64*b*) is compressed by the booster compressor (86). Flows of the refrigerant evaporated in the internal heat exchanger (64*a*) and of the refrigerant compressed by the booster compressor (86) are joined together, and then such refrigerant is sucked into the first compressor (14*a*) to be discharged again.

In the refrigerating/freezing operation, an evaporation temperature of the refrigerant in the internal heat exchanger (64*a*) is set at, e.g., 5° C., and an evaporation temperature of the refrigerant in the internal heat exchanger (64*b*) is set at, e.g., −30° C.

<Cooling/Air-Cooling Operation>

Figure 8:
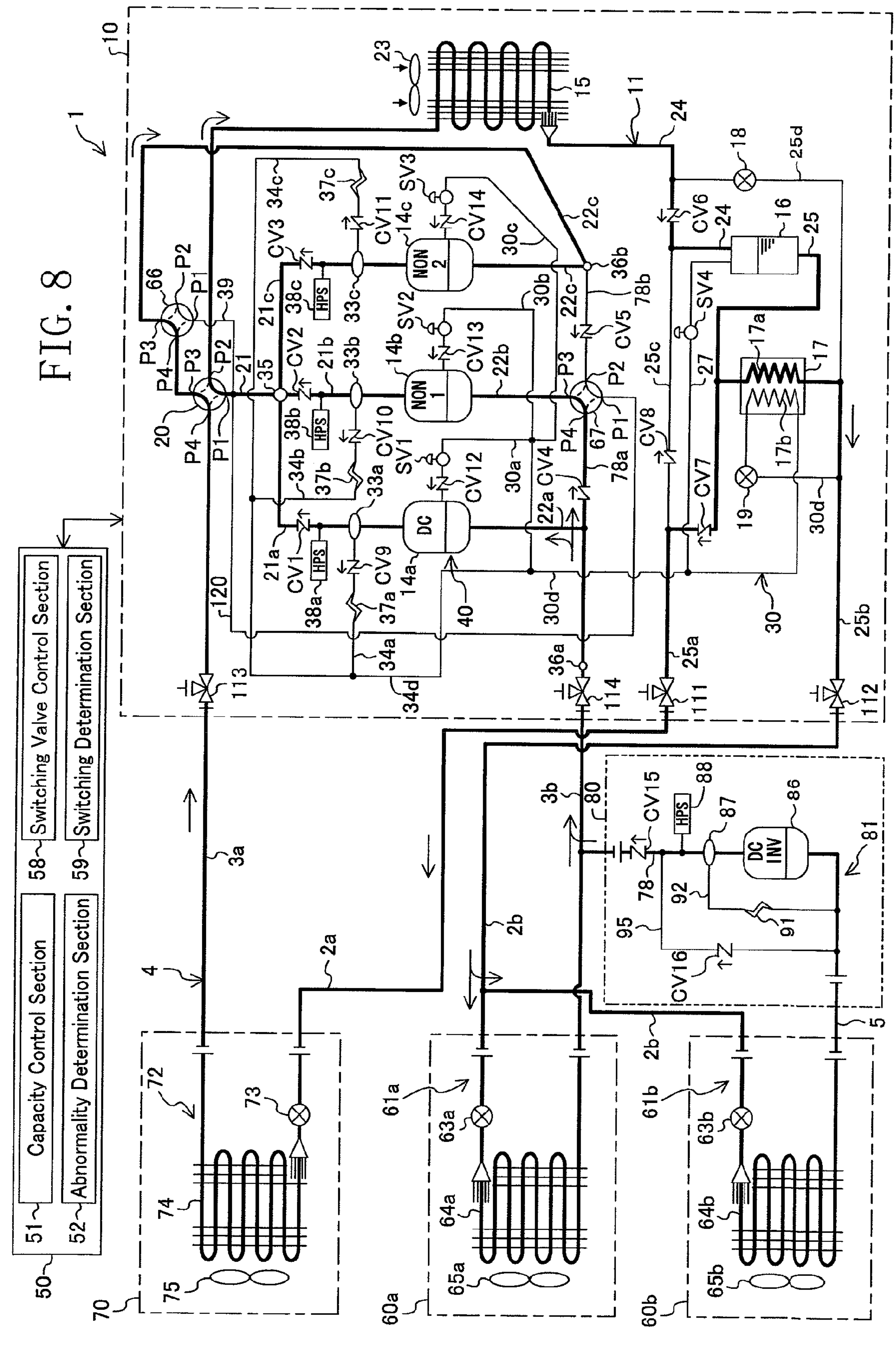
FIG. 8 is a refrigerant circuit diagram illustrating refrigerant flow during a cooling/air-cooling operation in Embodiment 2.

As illustrated in FIG. 8, in the cooling/air-cooling operation, the first compressor (14*a*) and the third compressor (14*c*) are operated with the first four-way switching valve (20) and the second four-way switching valve (66) being set to the first state. In the cooling/air-cooling operation, a vapor compression refrigeration cycle is performed, in which the outdoor heat exchanger (15) functions as the condenser, and the indoor heat exchanger (74) and each of the internal heat exchangers (64) function as the evaporator.

In the cooling/air-cooling operation, if the air-cooling capacity in the indoor unit (70) and the cooling capacity in the internal units (60) are sufficient, the operation of the second compressor (14*b*) is stopped. If the cooling capacity in the internal units (60) is insufficient, the second compressor (14*b*) is operated with the third four-way switching valve (67) being set to the first state. In such a case, the second compressor (14*b*) functions as the internal compressor. If the air-cooling capacity in the indoor unit (70) is insufficient, the second compressor (14*b*) is operated with the third four-way switching valve (67) being set to the second state. In such a case, the second compressor (14*b*) functions as the indoor compressor.

Specifically, in the cooling/air-cooling operation, refrigerant discharged from the first compressor (14*a*) and the third compressor (14*c*) is condensed in the outdoor heat exchanger (15). The refrigerant condensed in the outdoor heat exchanger

(15) is distributed to the first internal circuit (61a), the second internal circuit (61b), and the indoor circuit (72) through the receiver (16).

The refrigerant distributed to the first internal circuit (61a) and the second internal circuit (61b) circulates in the flow path similar to that in the refrigerating/freezing operation, and then is sucked into the first compressor (14a) to be discharged again. The refrigerant distributed to the indoor circuit (72) circulates in the flow path similar to that in the air-cooling operation, and then is sucked into the third compressor (14c) to be discharged again.

In the cooling/air-cooling operation, an evaporation temperature of the refrigerant in the indoor heat exchanger (74) is, e.g., approximately 10° C. An evaporation temperature of the refrigerant in the internal heat exchanger (64a) of the first internal circuit (61a) is set at, e.g., 5° C., and an evaporation temperature of the refrigerant in the internal heat exchanger (64b) of the second internal circuit (61b) is set at, e.g., −30° C. The evaporation temperature of the refrigerant in the indoor heat exchanger (74) is higher than that in the internal heat exchanger (64a) of the first internal circuit (61a).

<First Cooling/Air-Heating Operation>

Figure 9:
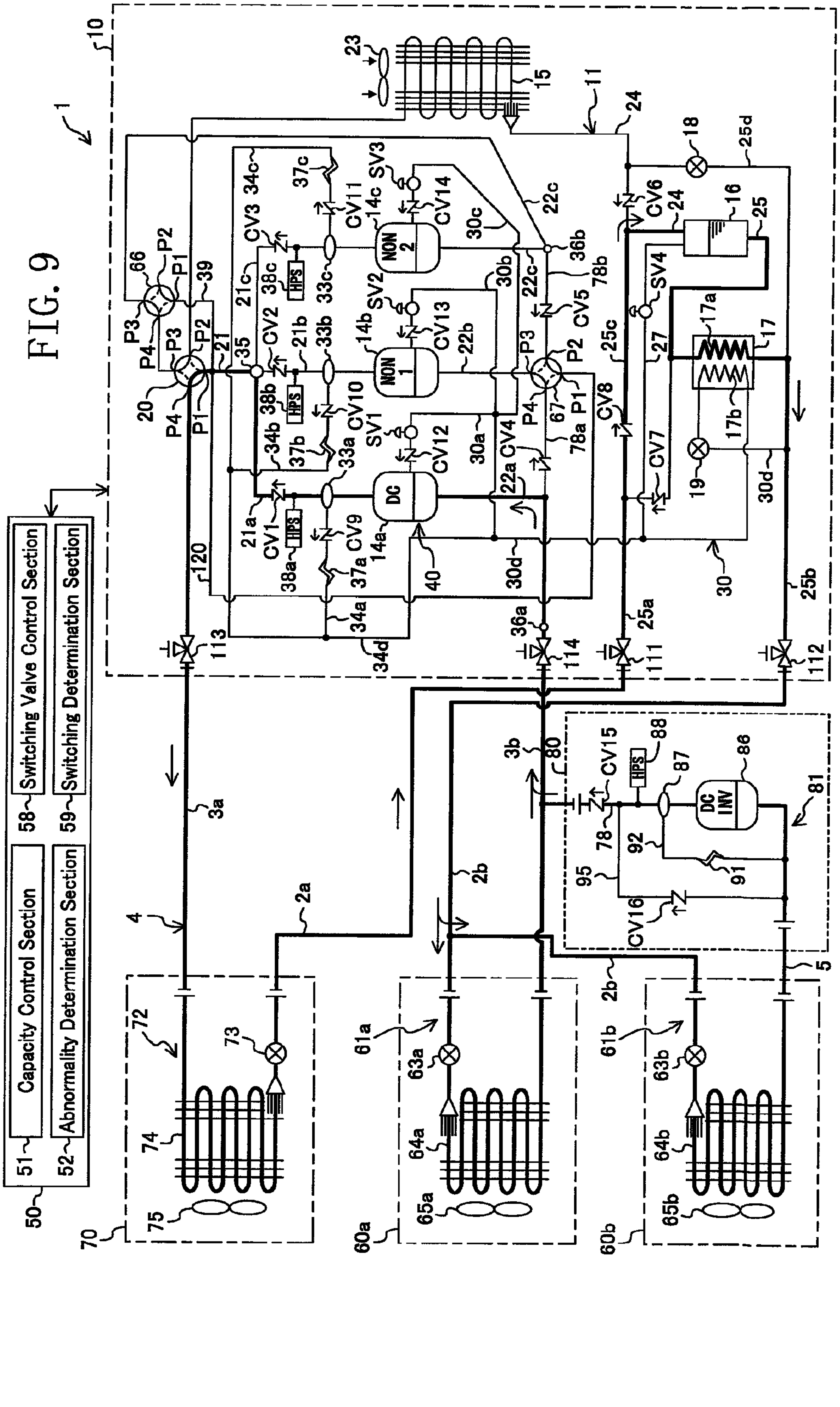
FIG. 9 is a refrigerant circuit diagram illustrating refrigerant flow during a first cooling/air-heating operation in Embodiment 2.

As illustrated in FIG. 9, in the first cooling/air-heating operation, the first compressor (14a) is operated with the first four-way switching valve (20) being set to the second state, and with the second four-way switching valve (66) being set to the first state. In the first cooling/air-heating operation, if the cooling capacity in the refrigerator is insufficient, the second compressor (14b) is also operated. At this point, the third four-way switching valve (67) is set to the first state. In the first cooling/air-heating operation, a vapor compression refrigeration cycle is performed, in which the indoor heat exchanger (74) functions as the condenser, and each of the internal heat exchangers (64) functions as the evaporator. During the first cooling/air-heating operation, the cooling capacity (an amount of evaporation heat) in the first internal unit (60a) and the second internal unit (60b) is balanced with the air-heating capacity (an amount of condensation heat) in the indoor unit (70), thereby achieving 100-percent heat recovery.

Specifically, refrigerant discharged from the first compressor (14a) is condensed by releasing heat to indoor air in the indoor heat exchanger (74). The refrigerant condensed in the indoor heat exchanger (74) is distributed to the first internal circuit (61a) and the second internal circuit (61b). The refrigerant distributed to the first internal circuit (61a) and the second internal circuit (61b) circulates in the flow path similar to that in the refrigerating/freezing operation, and then is sucked into the first compressor (14a) to be discharged again.

<Second Cooling/Air-Heating Operation>

Figure 10:
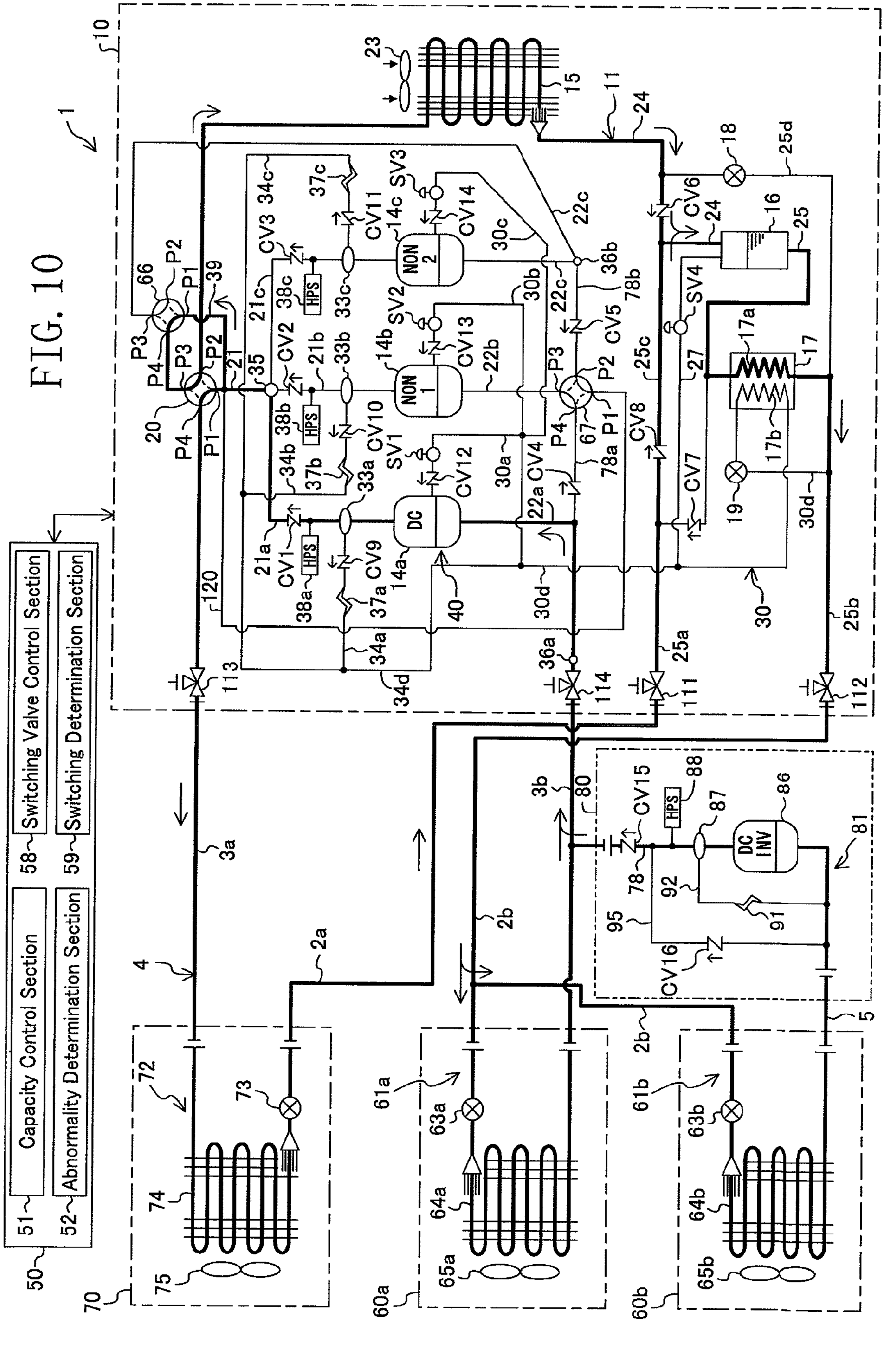
FIG. 10 is a refrigerant circuit diagram illustrating refrigerant flow during a second cooling/air-heating operation in Embodiment 2.

As illustrated in FIG. 10, if there is excess air-heating capacity during the first cooling/air-heating operation, the second cooling/air-heating operation is performed by switching the second four-way switching valve (66) to the second state. In the second cooling/air-heating operation, the outdoor heat exchanger (15) is operated as the condenser. The settings in the second cooling/air-heating operation are basically the same as those in the first cooling/air-heating operation, except for the second four-way switching valve (66).

In the second cooling/air-heating operation, a part of the refrigerant discharged from the first compressor (14a) flows into the outdoor heat exchanger (15). The refrigerant flowing into the outdoor heat exchanger (15) is condensed by releasing heat to outdoor air. A flow of the refrigerant condensed in the outdoor heat exchanger (15) joins a flow of the refrigerant condensed in the indoor heat exchanger (74), and then such refrigerant is distributed to the first internal circuit (61a) and the second internal circuit (61b). In the second cooling/air-heating operation, the cooling capacity (the amount of evaporation heat) in the first internal unit (60a) and the second internal unit (60b) is not balanced with the air-heating capacity (the amount of condensation heat) in the indoor unit (70), thereby releasing the excess condensation heat in the outdoor heat exchanger (15).

<Third Cooling/Air-Heating Operation>

Figure 11:
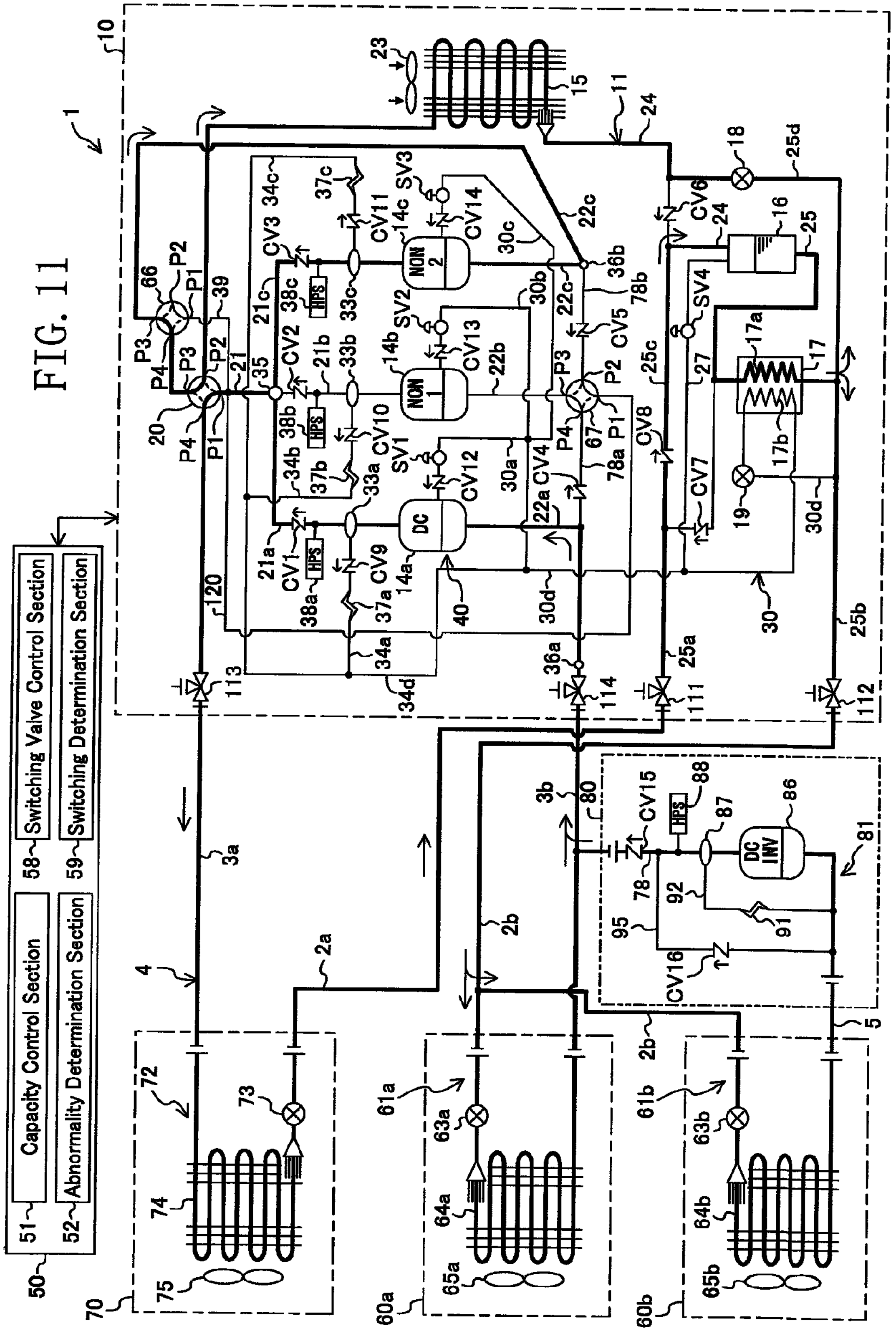
FIG. 11 is a refrigerant circuit diagram illustrating refrigerant flow during a third cooling/air-heating operation in Embodiment 2.

As illustrated in FIG. 11, if the air-heating capacity is insufficient during the first cooling/air-heating operation, the third cooling/air-heating operation is performed by operating the third compressor (14c) with the second four-way switching valve (66) being set to the first state, and with the first outdoor expansion valve (18) being set so as to be opened. In the third cooling/air-heating operation, a vapor compression refrigeration cycle is performed, in which the indoor heat exchanger (74) functions as the condenser, and each of the internal heat exchangers (64) and the outdoor heat exchanger (15) function as the evaporator.

In the third cooling/air-heating operation, the refrigerant condensed in the indoor heat exchanger (74) is distributed not only to the first internal circuit (61a) and the second internal circuit (61b), but also to the outdoor heat exchanger (15) side. After a pressure of the refrigerant distributed to the outdoor heat exchanger (15) is reduced by the first outdoor expansion valve (18), such refrigerant is evaporated in the outdoor heat exchanger (15), and then is sucked into the third compressor (14c) to be discharged again. In the third cooling/air-heating operation, the cooling capacity (the amount of evaporation heat) in the first internal unit (60a) and the second internal unit (60b) is not balanced with the air-heating capacity (the amount of condensation heat) in the indoor unit (70), thereby absorbing heat in the outdoor heat exchanger (15) to make up for the evaporation heat.

<Operation of Controller>

The operation of the controller (50) at the beginning of the refrigerating/freezing operation and the first cooling/air-heating operation will be described. Immediately after the compression mechanism (40) is started in the refrigerating/freezing operation and the first cooling/air-heating operation, the controller (50) controls the switching of the first four-way switching valve (20), followed by controlling the switching of the second four-way switching valve (66). When controlling the switchings of the first four-way switching valve (20) and of the second four-way switching valve (66), the controller (50) operates to shorten a time period required for the switching.

Before the initiation of the refrigerating/freezing operation and the first cooling/air-heating operation, the third four-way switching valve (67) is set to the first state. For example, the controller (50) sets the third four-way switching valve (67) to the first state when the refrigeration apparatus (1) is stopped.

First, the controller (50) controls the switching of the first four-way switching valve (20). As in Embodiment 1, the controller (50) proceeds from ST1 to ST7 of the flowchart illustrated in FIG. 3 during such control. Since ST1-ST3 and ST7 are the same as those in Embodiment 1, the description thereof is omitted.

At ST4, the switching determination section (59) performs a determination operation for determining whether or not the differential pressure calculated based on the difference between the detected values of the high-pressure sensor (35) and of the first low-pressure sensor (36a) is smaller than the determination value (e.g., 0.3 MPa).

At ST5, the capacity control section (51) starts the second compressor (14b) as the auxiliary compressor. Unlike the Embodiment 1, the capacity control section (51) does not start the third compressor (14*c*) instead of starting the second compressor (14*b*) even if the abnormality determination section (52) determines that there is the abnormality in the second compressor (14*b*).

At ST6, the switching determination section (59) performs a completion determination operation for determining whether or not the switching of the first four-way switching valve (20) is completed. The switching determination section (59) determines that the switching of the first four-way switching valve (20) is completed if any one of the following conditions is satisfied: a first condition under which the differential pressure calculated based on the difference between the detected values of the high-pressure sensor (35) and of the first low-pressure sensor (36*a*) exceeds a predetermined value (e.g., 0.5 MPa); a second condition under which the detected value of the high-pressure sensor (35) exceeds a predetermined value (e.g., 2.6 MPa); and a third condition under which Z seconds (e.g., Z=20 seconds) have elapsed since the second compressor (14*b*) was started.

After completion of the control of the switching of the first four-way switching valve (20), the controller (50) initiates the control of the switching of the second four-way switching valve (66). The operation of the controller (50) is the same as that when controlling the switching of the first four-way switching valve (20), except for ST2. At ST2, since the first compressor (14*a*) has already been started, the controller (50) does not instruct the first compressor (14*a*) to start. At ST2, the controller (50) proceeds to ST3 after X seconds (e.g., X=5 seconds) has elapsed.

After completion of the control of the switching of the second four-way switching valve (66), the capacity control section (51) detects whether or not the operating frequency of the first compressor (14*a*) matches the frequency instructed at ST2 in a similar manner as in ST8 of Embodiment 1. The capacity control section (51) initiates a capacity control operation for controlling the operating capacity of the compression mechanism (40) depending on the operating capacity to be required, thereby increasing the operating capacity of the first compressor (14*a*).

Other Embodiment

The above-described embodiments may have the following structures.

In the above-described embodiments, the refrigeration apparatus (1) may be an air-conditioning device in which the four-way switching valve (20) switches between the air-cooling operation and the air-heating operation.

In addition, in the above-described embodiments, a fourth gas pipe communicating with the discharge side of the compression mechanism (40) may be connected to the pilot valve (54). The pilot valve (54) switches between a state in which the first gas pipe (41) communicates with the second gas pipe (42) with the third gas pipe (43) communicating with the fourth gas pipe, and a state in which the first gas pipe (41) communicates with the fourth gas pipe with the second gas pipe (42) communicating with third gas pipe (43).

In the above-described embodiments, the first compressor (14*a*) may not be the compressor using the differential-pressure-type oil supply method, but may be a compressor supplying oil only by, e.g., a centrifugal pump.

The above-described embodiments are provided as preferable examples, and are not intended to limit the present invention, objects to which the present invention is applied, or use thereof.

INDUSTRIAL APPLICABILITY

As described above, the present invention is useful in a refrigeration apparatus in which a four-way switching valve is connected to a compression mechanism including a plurality of compressors.

The invention claimed is:

1. A refrigeration apparatus including a refrigerant circuit provided with a compression mechanism in which a first compressor with variable operating capacity and a second compressor with fixed operating capacity are connected to each other on a discharge side; and with a pilot-type four-way switching valve which is able to switch depending on a differential pressure between a high-pressure port which is connected to the compression mechanism, and which communicates with the discharge side of the compression mechanism, and a low-pressure port communicating with a suction side of the compression mechanism, the refrigeration apparatus comprising:

a capacity control section for starting the first compressor at a lower operating capacity level when starting thereof;

a switching valve control section for outputting a switching signal for controlling the four-way switching valve to a predetermined switching state when starting the compression mechanism; and a switching determination section which, when starting only the first compressor as a start-up of the compression mechanism, performs a determination operation for comparing the differential pressure with a predetermined determination value after the switching signal being outputted by the switching valve control section, and which outputs a low differential pressure signal if the differential pressure falls below the determination value in the determination operation, wherein the capacity control section starts the second compressor after the switching determination section outputs the low differential pressure signal.

2. The refrigeration apparatus of claim 1, wherein the capacity control section maintains the operating capacity of the first compressor constant after the first compressor is started and before the determination operation is completed.

3. The refrigeration apparatus of claim 1, wherein, after the low differential pressure signal is outputted, the switching determination section outputs a switching completion signal if a completion condition for determining whether or not the switching of the four-way switching valve is completed is satisfied; and the capacity control section stops the second compressor when the switching determination section outputs the switching completion signal.

4. The refrigeration apparatus of claim 3, wherein the capacity control section maintains the operating capacity of the first compressor constant after the first compressor is started and before the second compressor is stopped.

5. The refrigeration apparatus of claim 1, wherein the compression mechanism includes a third compressor with fixed operating capacity, and the first compressor, the second compressor, and the third compressor are connected to each other in parallel;

the refrigeration apparatus further includes an abnormality determination section for determining whether or not there is an abnormality in the second compressor; and the capacity control section starts the third compressor instead of starting the second compressor if the abnormality determination section determines that there is the abnormality in the second compressor, and if the differential pressure falls below the determination value in the determination operation.

6. The refrigeration apparatus of any one of claims 1 to 5, wherein oil is supplied to a sliding portion of the first compressor based on the differential pressure.

* * * * *